United States Patent [19]

Yoshino et al.

[11] Patent Number: 4,584,477
[45] Date of Patent: Apr. 22, 1986

[54] METHOD FOR MEASURING DISTANCE AND OPTICAL DISTANCE METER

[75] Inventors: Tsunemi Yoshino, Nara; Toshihiko Taniguchi, Osaka; Hirohiko Ina, Nishinomiya, all of Japan

[73] Assignee: West Electric Company, Ltd., Osaka, Japan

[21] Appl. No.: 675,705

[22] Filed: Nov. 28, 1984

[30] Foreign Application Priority Data

Nov. 29, 1983 [JP] Japan .................. 58-224757
Jun. 12, 1984 [JP] Japan .................. 59-121217
Jul. 11, 1984 [JP] Japan .................. 59-143684

[51] Int. Cl.$^4$ .................................................. G01C 3/08
[52] U.S. Cl. .................................. 250/351; 250/338; 250/341; 356/4; 33/125 A
[58] Field of Search .......... 250/351, 341, 340, 338 R; 356/5, 4; 33/125 A

[56] References Cited

U.S. PATENT DOCUMENTS 3,082,324  3/1963  Schuck ..................... 250/351
3,649,123  3/1972  Ulicki ........................ 356/5
3,841,755  10/1974  Debart ...................... 356/28

OTHER PUBLICATIONS

Anon., "Camera's Infrared Eye Focuses on New Vistas for Ranging", *Electronics* (Apr. 27, 1970) pp. 102-105.

*Primary Examiner*—Alfred E. Smith
*Assistant Examiner*—Constantine Hannaher
*Attorney, Agent, or Firm*—Cushman, Darby & Cushman

[57] ABSTRACT

In a method of distance measuring and an optical distance measuring apparatus, a pulse-modulated infrared light beam is irradiated to an object to produce a reflected light beam, which is then received by a resonance circuit, and intensity of output of the resonance circuit is measured, wherein the modulation of frequency is sweepingly varied within a predetermined narrow frequency range; thereby, even when the circuit constants of the resonance circuit varies due to temperature change and so on, the distance measurement result is not affected, and stable measurement of a long distance is possible.

18 Claims, 19 Drawing Figures

METHOD FOR MEASURING DISTANCE AND OPTICAL DISTANCE METER

BACKGROUND OF THE INVENTION

1. Field of the Invention

The present invention relates generally to an improvement of optical distance measuring method and an optical distance meter for measuring distance to an object by utilizing light beam irradiated from the distance meter to an object. The present invention particularly concerns an improvement in optical distance measuring method an optical distance meter which uses infrared light beam and measures distance by measuring intensity of light reflected from the object.

2. Description of the Prior Art

Hitherto, as method of measuring distance by optical method, there are a first method of transmitting an infrared light beam onto the object and measuring intensity of light beam reflected thereby and a second method of transmitting an infrared light beam onto the object to make triangulation.

The above-mentioned first method distance measuring method is advantageous since the apparatus does not need expensive array of photoelectric elements nor need a long base line length. But the above-mentioned type distance measuring system has such a problem as necessitating a constant intensity of the transmitted light beam and also large intensity of the light beam to enable measurement of a long distance with a high accuracy. This is because the system is to measure the intensity of the reflected light which is produced by transmitting a light beam of an accurately controlled constant intensity. Therefore, in order to achieve such accurate controlling of the transmitted light beam, a great care must be taken in selection of the light transmission part and the power source and the shape.

Accordingly, in order to enable measurement of a considerable distance with the light beam of a small energy, that is, in order to improve efficiency of the light receiving, recent improvement proposes use of pulse-modulation of the transmitted infrared light beam with a predetermined modulation frequency and to receive the pulse-modulated infrared light beam with a receiver having a resonator which resonate to the predetermined modulation frequency.

Though using the above-mentioned system, yet there is a difficulty that the resonance frequency is likely to deviate due to divergence of electric constants thereof and thermal fluctuation of them, and that the resonance frequency must be accurately tuned in order to achieve a receiving signal at a high sensitivity.

Accordingly, further improvements to dissolve the above-mentioned problems have been strongly expected.

SUMMARY OF THE INVENTION

The distance measuring method and the optical distance meter in accordance with the present invention is for providing an improved method and apparatus capable of measuring a considerable distance by transmitting a pulse-modulated infrared light beam to an object and receiving the reflected light beam with a high sensitivity receiver.

The optical distance meter in accordance with the present invention comprises:

a light transmitter for transmitting an infrared light to an object, a light transmitting means for making pulse-modulation of the infrared light with a modulation signal having frequency which is sweepingly varied within a predetermined frequency range, a light beam receiving means for receiving reflected light from the object to convert it into electric signal, a tuning means for making resonation of the electric signal, with a resonation frequency selected in the predetermined frequency range to produce a high voltage output signal, a distance signal generating means for generating a distance signal corresponding to the high voltage output signal.

Further, method of optical measuring of distance comprising the steps of:

pulse-modulating an infrared light by a pulse having frequency which is sweeping in a predetermined frequency range, thereby to produce a pulse-modulated infrared light, transmitting the infrared light to an object, photoelectrically transducing reflected infrared light which is reflected from the object to produce an electric pulse signal, introducing the electric pulse signal to a resonator with a resonance frequency selected in the predetermined frequency range, thereby to make periodical resonation or tuning in the resonator and generating high voltage output signal through the resonation, and issuing a distance signal corresponding to the high voltage output signal.

DESCRIPTION OF THE PREFERRED EMBODIMENTS

Figure 1:
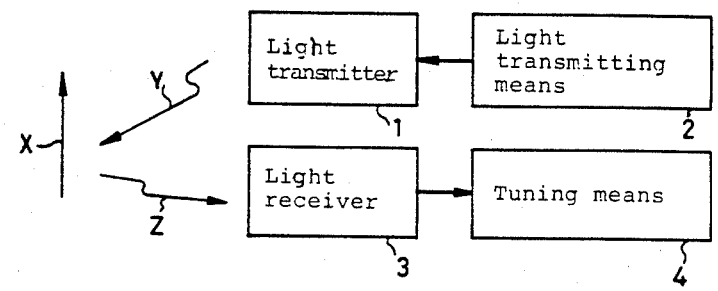
FIG. 1 is a block diagram for explaining a method of measuring distance in accordance with the present invention.

FIG. 1 is a block diagram for explaining the principle of a distance measuring method in accordance with the present invention, and in the diagram, numeral 1 designates a light transmitter transmitting an infrared light beam Y toward an object X. Numeral 2 designates a light transmitting means which performs light transmission while varying the pulse frequency of pulse modulation of the light transmitted from the light transmitter 1 within a predetermined frequency band having a larger width of range than the width of fluctuation of a resonance frequency of a resonance circuit produced by scattering of constants of electric components and the like. Hereinafter, the "pulse frequency of pulse modulation of the transmitted light" is simply referred to as "transmitted light frequency" for simplicity. Numeral 3 designates a light receiving means which receives a light beam Z reflected from the object X of the infrared light beam Y. And numeral 4 designates a tuning means which receives a light receiving signal from the light receiving means, and also has a frequency which resonates with an arbitrary frequency within the above-mentioned predetermined frequency band as a resonance frequency, and detects the intensity of received light of the above-mentioned light receiver.

In the block diagram in FIG. 1, assuming that operation of the light transmitting means 2 is performed, the light transmitter 1 performs light transmitting operation which transmit the infrared light beam Y, frequency of modulation pulse of which varies continuously or discretely step by step within a predetermined frequency band wherein the pulse-modulated frequency of transmitted light beam is determined by the light transmitting means 2.

Subsequently, the above-mentioned infrared light beam Y is reflected by the object X, and the reflected light beam Z is received by the light receiver 3. Such an output of light receiving signal also becomes a signal responding to the frequency of modulation pulse within the above-mentioned frequency band. Accordingly, a resonance means or the tuning means 4, whereto the light receiving signal of the light receiver 3 is supplied, resonates with a part of the light receiving signal whose frequency varies within the above-mentioned predetermined frequency band.

Here, considering the output signal of the above-mentioned tuning means 4, it is needless to say that both the signal not resonating and the signal resonating have a level corresponding to the distance to the object X.

That is to say, the levels of both signals vary in response to the distance to the object X. As a result, conversion into a desired distance signal can be performed by supplying the output signal of the above described tuning means 4, for example, to a proper distance signal generating means.

At this time, in the present embodiment, it can be realized very simply, for example, by providing a peak detecting means that a resonating output signal is utilized as an output signal of the tuning means 4 for generating the above-mentioned desired distance signal. Accordingly, the distance measurement can be carried out up to a large distance with a good precision even if the transmitted light energy is small.

Furthermore, in the distance measuring method in accordance with the present invention, even if the characteristics of light transmission or tuned frequency are varied due to scattering of the light transmitting means or the like because of changing the transmitted light frequency within a predetermined frequency band, resonance operation is certainly performed on a different frequency from the frequency initially set, for example, if the resonance frequency of the tuning means 4 is set on a frequency at nearly the center of the above-mentioned predetermined frequency band in the case where the primary resonance operation is utilized. That is to say, in the present invention, there is no need at all to pay attention to such frequency matching as in the conventional cases, and the advantage of the system wherein light intensity is detected as described at the opening can be utilized effectively.

Next, description is made on one embodiment of an optical distance meter employing the distance measuring method in accordance with the present invention as described above.

Figure 2:
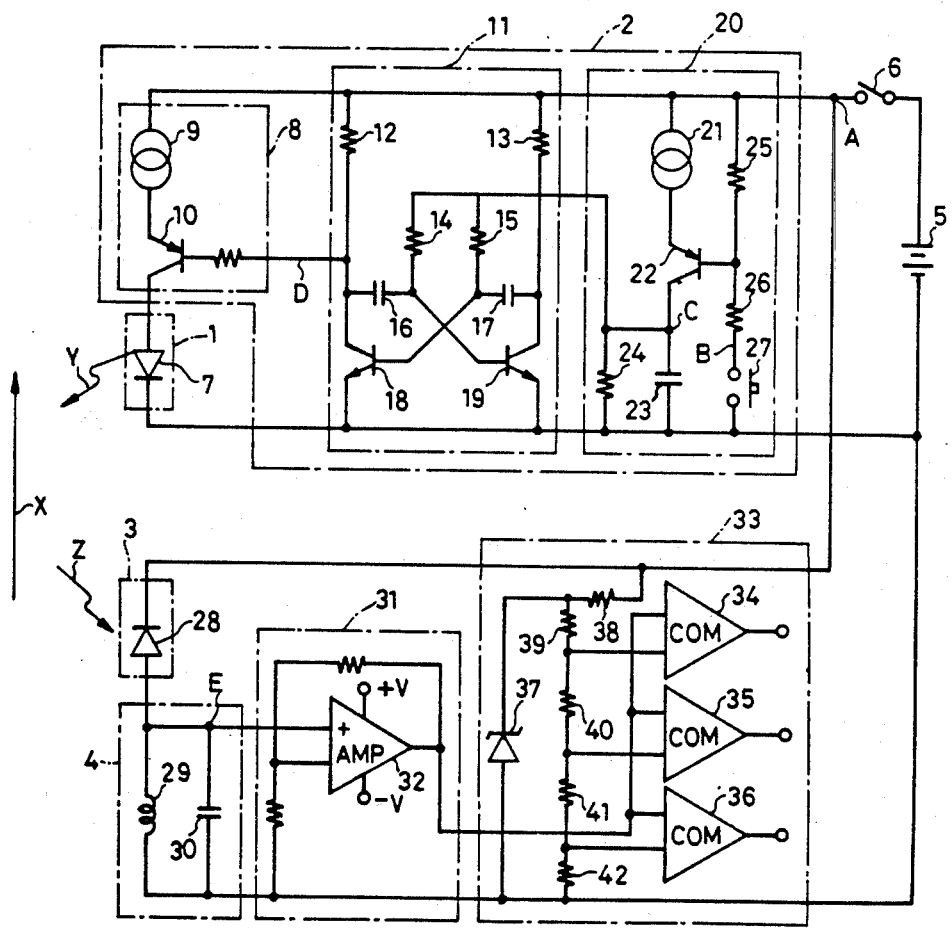
FIG. 2 is an electric circuit disgram showing one embodiment of an optical distance meter in accordance with the present invention.

FIG. 2 is an electric circuit diagram showing one embodiment of the optical distance meter in accordance with the present invention, and in this diagram, the same drawing number as that in FIG. 1 shows a corresponding part. In addition, such embodiment is an embodiment wherein the transmitted light frequency is variable in continuous manner.

Then, numeral 5 designates a power source as an energy source, numeral 6 designates a power switch, numeral 7 designates an LED emitting an infrared light as the light transmitter 1.

Also, numeral 8 designates a drive circuit which comprises a first constant current source 9 and a transistor 10 and supplies the light transmitter 1 with an energy of the power source 5 as light transmitting energy, numeral 11 designates an oscillation circuit which is composed of an astable multivibrator comprising resistors 12, 13, 14 and 15, capacitors 16 and 17 and transistors 18 and 19, and supplies the drive circuit 8 with a pulse-modulation signal whose pulse frequency is varied continuously within a frequency band having a far larger width than the width of frequency variation produced by scattering of electric parts and the like, numeral 20 designates a control circuit which is composed of a second constant current source 21, a transistor 22, a capacitor 23, resistors 24, 25 and 26 and a start switch 27, and continuously changes the pulse oscillation frequency of the oscillation circuit 11, and these drive circuit 8, oscillation circuit 11 and control circuit 20 constitute the light transmitting means 2 which varies the transmitted light frequency of the light transmitter 1 as described in FIG. 1 within a predetermined frequency band.

Numeral 28 designates a photosensor which receives the infrared light beam reflected from the object X, and forms the light receiver 3 in FIG. 1.

Numeral 29 designates a coil and numeral 30 designates a capacitor connected in parallel with the coil 29, and the both constitute a resonance circuit having an arbitrary resonance frequency, forming the tuning means 4 in FIG. 1.

Numeral 31 designates an amplifier part which is composed of an amplifier 32 and the like and amplifies an output signal from the above-described tuning means 4.

Numeral 33 designates a distance signal generator circuit which is composed of a plurality of comparators 34, 35 and 36, a zener diode 37 and resistors 38, 39, 40, 41 and 42, and generates a desired distance signal from the output signal of the amplifier part 31.

Figure 3:
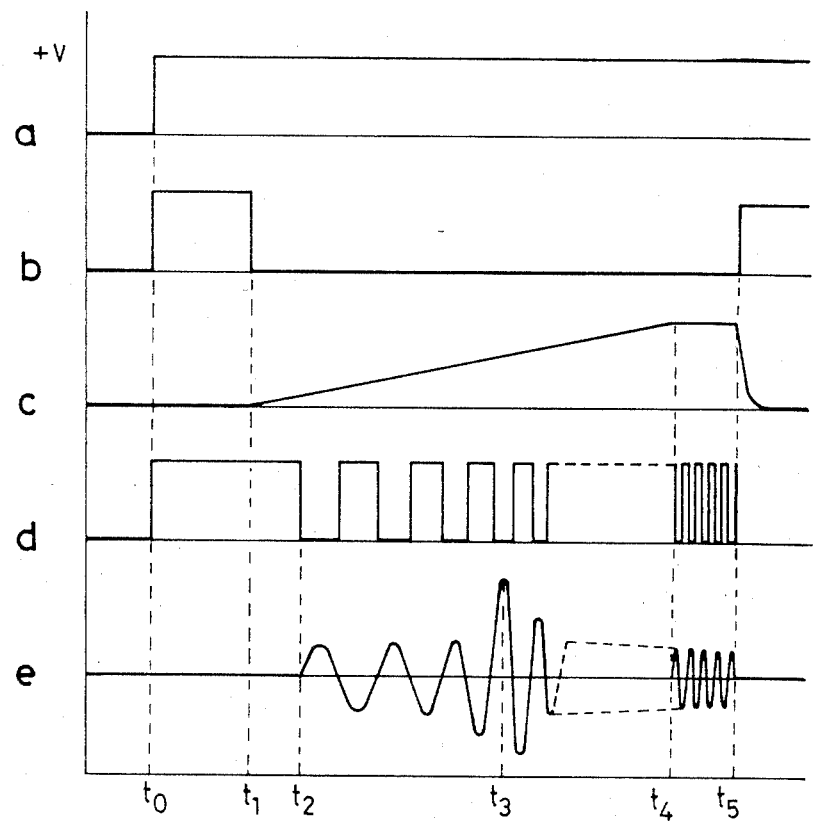
FIG. 3 is a graph of signal waveform at an arbitrary point in a circuit as shown in FIG. 2.

Hereinafter, description is made on operation of one embodiment of the optical distance meter in accordance with the present invention which is constituted as described above in reference to a graph of signal waveform at an arbitrary point in FIG. 2 as shown in FIG. 3.

First, when the power switch 6 is turned on at an arbitrary time $t_0$, as shown by a waveform a of FIG. 3, a voltage $+V$ of the power source 5 appears at a point A in FIG. 2, and this voltage is supplied to the drive circuit 8, the oscillation circuit 11, the control circuit 20 and the like, and each circuit is put in an activated state.

However, in the state as mentioned above, since the start switch 27 is turned off, the transistor 22 in the control circuit 20 keeps a non-conductive state, and accordingly the capacitor 23 is not supplied with a current from the second constant current circuit 21.

Consequently, the transistors 18 and 19 in the oscillation circuit 11 are put in a state wherein their bases are grounded through the resistors 14, 15 and 24, respectively to keep a non-conductive state, and needless to say, no oscillatory operation is performed.

By keeping the transistor 18 in the oscillation circuit 11 in a non-conductive state, as is obvious from FIG. 2, the potential of the base of the transistor 10 in the drive circuit 8, that is, the potential of an output terminal D of the oscillation circuit 11 as described later becomes high by turning on the power switch 6, and accordingly, this transistor 10 is not put in a conductive state, and therefore, the LED 7 of the light transmitter 1 is not supplied with a current from the first constant current circuit 9.

That is, in the circuit as illustrated in FIG. 2, no infrared light beam is transmitted from the light transmitter 1 only by turning on the power switch 6.

At an arbitrary time $t_1$ after the time $t_0$ when the state as mentioned above is kept, if the start switch 27 is turned on to perform a distance measuring operation, the potential of a point B in FIG. 2 kept at the high level after the time $t_0$ falls as shown by a waveform b of FIG. 3, and therefore the transistor 22 which has been kept in a non-conductive state till then is put in a conductive state.

When the transistor 22 is put in a conductive state, the capacitor 23 is charged by a constant quantity by a current supplied from the second constant current circuit 21 through the transistor 22, and the potential of a point C in FIG. 2 rises after the time $t_1$ as shown by a waveform c of FIG. 3.

That is, the control circuit 20 outputs a voltage as shown by the waveform c of FIG. 3 when the start switch 27 is turned on.

Now, the charging voltage of the above-mentioned capacitor 23, as obvious from FIG. 2, is supplied to the bases of the transistors 18 and 19 in the control circuit 4.

For this reason, either of the above-mentioned transistors 18 and 19 conducts a current first, and thereafter an oscillatory operation which alternately repeats conduction and non-conduction is started. That is, as described previously, the oscillation circuit 11 is composed of an astable multivibrator, and needless to say, charging is performed in both directions of the capacitors 16 and 17 through the resistors 12, 13, 14 and 15 and the transistors 18 and 19, and thereby the oscillatory operation is performed.

To be further detailed, in the above-mentioned oscillatory operation, first, in a charging operation of the capacitors 16 and 17 through the resistors 12 and 13, charging is always performed by a charging current of constant conditions because the energy source is the power source 5.

On the other hand, in the charging operation of the capacitors performed through the resistors 14 and 15, the characteristic of the charging current to be supplied increases gradually because the energy source is the output voltage of the above-mentioned control circuit 20, that is, the charging voltage of the capacitor 23 as shown by the waveform c of FIG. 3.

Accordingly, the above-mentioned oscillatory operation in the oscillation circuit 11 becomes such an operation that the oscillation frequency thereof varies continuously from the low frequency to the high frequency, and to the point D in FIG. 2 which is an output terminal, an oscillation output signal as shown by a waveform d of FIG. 3, that is, pulses whose frequency varies with the lapse of time are outputted after $t_2$ which is a time of conduction of either of the transistors.

In addition, the state as illustrated by the waveform d of FIG. 3 corresponds to the case where the transistor 18 becomes a conductive state first, and needless to say, the above-mentioned oscillation frequency such as the one whereon the charging voltage of the capacitor 23 reaches for example; a saturation region is stabilized, and such a state is shown from a time $t_4$ of FIG. 3 to a time $t_5$ at which the start switch 27 is opened.

However, it is needless to say that there is no need to be sure to reach the saturation region.

Now, the point D which is the output terminal of the above-mentioned oscillation circuit 11 is connected to the base of the transistor 10 in the drive circuit 8 through a resistor which is not designated by the drawing number, and accordingly, this transistor 10 performs conductive and non-conductive operations in response to the state at the above-mentioned point D, that is, a voltage signal as shown by the waveform d of FIG. 3.

When the transistor 10 performs conductive and non-conductive operations, a constant current is supplied from the first constant current circuit 9 to the LED 7 of the light transmitter 1 during the conduction thereof, and therefore the light transmitter 1 transmits an infrared light beam modulated with the frequency of voltage waveform as shown by the waveform d of FIG. 3 toward the object X.

When an infrared light beam whose transmitted light frequency is varied is transmitted to the object X from the light transmitter 1, subsequently, the light beam reflected by the object X is received by the photosensor 28 of the light receiver 3, and the photosensor 28 supplies the tuning means 4 with a received light current corresponding to the level of reflected light which is received.

It is well known that the tuning means 4 has a predetermined resonance frequency which is determined by the characteristics of the coil 29 and the capacitor 30. Also, in the present invention, as is described previously, this resonance frequency is set so as to resonate with a certain frequency included within a frequency range wherein the transmitted light frequency of the light transmitter 1 is variable. Accordingly, by a supply of the received light current as described above, an output voltage having a peak amplitude at a time when the transmitted light frequqncy of the light transmitter 1 becomes a frequency which resonates with the resonance frequency of the tuning means 4 is output to a point E in the circuit diagram. In addition, one example of signal waveform at the point E is shown by a waveform e of FIG. 3, and, for example, a signal having an extremely large amplitude is outputted at the time $t_3$ when the transmitted light frequency becomes a frequency which resonates with the resonance frequency of the tuning means 4.

Furthermore, the amplitude of the output signal of the above-mentioned tuning means 4 corresponds to the received light current supplied by the photosensor 28, and eventually, the amplitude at the time $t_3$ as shown by the waveform e of FIG. 3 corresponds to the distance to the object X when the operation as described above is performed.

Accordingly, in the above-mentioned example, the distance signal to the object X is obtained by a proper processing of the amplitude at the time $t_3$, and hereinafter brief description is made on this point.

In one embodiment as shown in FIG. 2, the output signal as shown by the waveform e of FIG. 3 at the point E which is the output terminal of the tuning means 4 is supplied to each one input terminal of a plurality of comparators 34, 35 and 36 of the distance signal generator circuit 33 through the amplifier part 31 having the amplifier 32.

On the other hand, the other input terminals of the comparator 34, 35 and 36 are supplied with a reference voltage which is set by the zener diode 37, and the resistors 38, 39, 40, 41 and 42, in advance.

Accordingly, when the operation as described above is performed by turning on the power switch 6 and then the start switch 27, the signal that the output signal of the tuning means 4 is amplified is compared with the reference voltage, and for the output signal of the above-mentioned tuning means 4, the state with respect to the distance is discriminated, and relationships such that among the comparators, for example, an operation of the comparator 34 indicates 0.7 m and an operation of the comparator 35 indicates 3 m are electrically obtained as the output state of the comparators.

In addition, although there is no need for detailed description in this case, a consideration so-called peak hold is required to be taken such that because the signal when the resonance operation is performed is utilized for the output signal of the tuning means 4, for example, the output state of comparators 34, 35 and 36 is kept, or for the output of the amplifier part 31, a maximum of the output signal of the tuning means 4 is amplified and kept and so on.

Furthermore, it is needless to say that the distance signal generator circuit 33 is not limited by way of generating the distance signal by means of three comparators 34, 35 and 36 as shown in FIG. 2, and for example, setting can be made so that a large number of distance signals can be outputted every 10 cm by setting the reference voltage variously.

As is obvious from the operation as described above, for example, even if the oscillation frequency of the oscillation circuit 11 and the resonance frequency of the tuning means 4 are varied due to scattering of parts and the like, setting is made so that the transmitted light frequency is varied by the control circuit 20 within a range far wider than the possible width of variation thereof, and therefore, the time $t_3$ which is a resonance operation point as explained in the previous example shifts only a little to the $t_2$ side or to the $t_4$ side, and the oscillation operation itself is never lost, and accordingly, in the present invention, a consideration on the frequency matching which is extremely complicated is not required at all.

Figure 4:
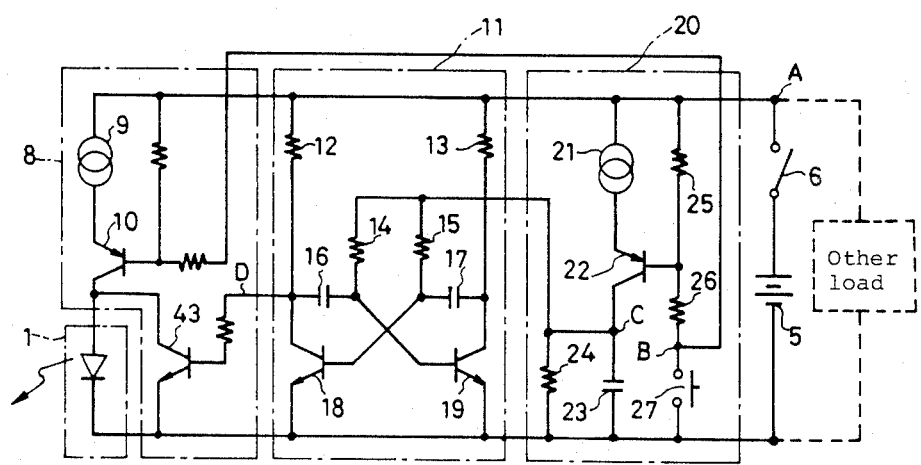
FIG. 4 an electric circuit diagram of a light transmitting side of another embodiment of an optical distance meter in accordance with the present invention.

FIG. 4 shows another embodiment of the optical distance meter in accordance with the present invention wherein the transmitted light frequency is varied continuously likewise the embodiment in FIG. 2, being an electric circuit diagram of the light transmitter side only.

In the diagram, a part designated by the same drawing number as that in the FIG. 2 designates the same part, and numeral 43 designates transistor as switching elements connected in parallel to the light transmitter 1, which control a current supplied to the light transmitter 1 from the first constant current source 9, and constitute a part of the drive circuit 8.

Such an embodiment is suitable for the case where the power source 5 in the embodiment as shown in FIG. 2 is used in common, for example, with any other electric circuit system as shown by dashed lines.

That is, in the embodiment as shown in FIG. 2, a current driving the light transmitter 1 is controlled by means of conduction and non-conduction of the transistor 10, and therefore, there are cases of presence and absence when viewed from the power source 5, and accordingly, the distance measuring operation in the above-mentioned embodiment of FIG. 2 gives a large variation in load to the power source 5, and produces a fluctuation in the power line voltage when the operation of the transistor 10 is inverted, and consequently if the power source 5 is used in common with other circuits as it is in FIG. 2, the effect of the above-mentioned fluctuation is large, and an occurrence of malfunction or the like is expected, and an embodiment as shown in FIG. 4 eliminates the above-mentioned fluctuation.

Hereinafter, description is made on operation of the embodiment as shown in FIG. 4.

As is obvious from the drawing, operations themselves of the oscillation circuit 11 and the control circuit 20 are the same as those of the embodiment of FIG. 2.

However, the bases of the transistors 10 and 43 of the drive circuit 8 are connected to the point A and the output terminal of the oscillation circuit 11 in FIG. 2, respectively.

Accordingly, in the embodiment as shown in FIG. 4, when the start switch 27 is turned on in a state where the power switch 6 is turned on, the transistor 10 is put in a conductive state instantly, while the transistor 43 repeats conduction and non-conduction by the output voltage of the oscillation circuit 11 as shown by the waveform d of FIG. 3.

As a result, a current supplied to the light transmitter 1 from the first constant current source 9 flows continuously through the light transmitter 1 and the transistor 43 during the start switch 27 is turned on.

That is, a current from the first constant current source 9 flows through the light transmitter 1 when the transistor 43 is non-conductive, and flows through the transistor 43 when the transistor 43 is conductive. Because, such an embodiment controls the light transmitting operation of the light transmitter 1 by means of bypassing or non-bypassing of the supplied current.

Accordingly, the transmitted light frequency of the light transmitter 1, as is described previously, varies continuously within a predetermined frequency band likewise the embodiment in FIG. 2 because the conductive and non-conductive operations of the transistor 43 are controlled by the output of the oscillation circuit 11.

However, unlike the embodiment in FIG. 2, even if the transmitted light frequency of the light transmitter 1 is varied, a current from the first constant current source 9 to be supplied to the light transmitter 1 is not lost, and accordingly, no fluctuation takes place on the power line.

As is described above, in the embodiment as shown in FIG. 4, a current supplied by the first constant current source 9 flows through either of the light transmitter 1 and the transistor 43 during the start switch 27 is turned on, and therefore the fluctuation produced on the power line can be sure to be prevented.

Furthermore, in the embodiment as shown in FIG. 2 and FIG. 4, the charging voltage of the capacitor 23 charged by the second constant current source 21 of the control circuit 20 is utilized for an energy supply source for varying the oscillation frequency of the oscillation circuit 11, that is, a voltage source whose voltage value varies with time, but from the viewpoint of the object and action of the present invention as detailed till now, that is, of detecting the intensity of received light by means of resonance operation by changing the transmitted light frequency of the light transmitter, it is needless to say that the terminal voltage at discharging operation of capacitor may be utilized for the above-mentioned energy supply source of the oscillation circuit 11.

Figure 5:
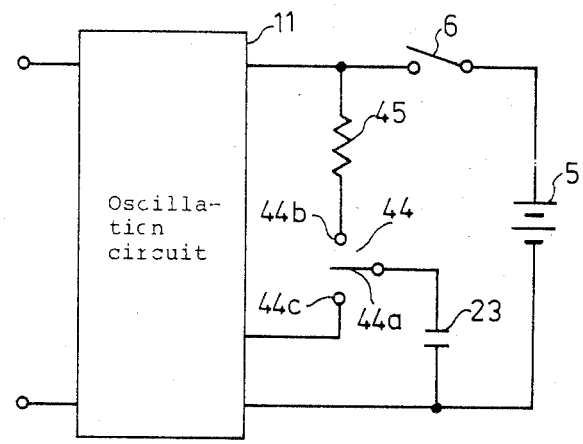
FIG. 5 shows an electric circuit diagram of a light transmitting side of another embodiment of an optical distance meter in accordance with the present invention.

That is to say, for example, as shown in a modified embodiment in FIG. 5, the capacitor 23 is connected to the power source part, which is composed of the power source 5 and the power switch 6, the oscillation circuit 11 through a change-over switch 44 and a resistor 45, and a contact piece 44a of the change-over switch 44 is brought in contact with a contact 44b all the time, and the above-mentioned contact piece 44a is charging over to a contact 44c at distance measurement, and thereby the discharge voltage of the capacitor 23 can be simply utilized for an energy supply source of the oscillation circuit 11, and needless to say, an action of detecting the intensity of received light through the resonance operation can be expected.

Also, in the embodiment as shown in FIG. 2 and FIG. 4, the second constant current source 21 or the like is employed for a power source for charging the capacitor 23 of the control circuit 20 to obtain a linear characteristic for the charging characteristic, that is, the transmitted light frequency is made to vary in proportion to the charging time of the capacitor 23, but it is clearly apparent from the viewpoint of the object and action of the present invention that the charging characteristic of this capacitor 23 is not limited to the above-described linear characteristic, and a well-known CR charging characteristic may also be employed which is produced by replacing the above-mentioned second constant current source 21 with a simple resistor or by connecting the capacitor 23 to the power switch through the start switch 27 and a predetermined resistor.

Furthermore, in the embodiment as shown in FIG. 2, the light receiver 3 and the tuning means 4 are connected in series from the high potential side of the power source 5, and a signal at the point E in FIG. 2 is supplied to the amplifier part 31.

Accordingly, when the power source 5 produces a voltage variation, the effect thereof is instantly inputted to the amplifier part 31, and in view of practical use, such an embodiment has a great limitation that the voltage variation of the power source 5 has to be reduced to the utmost. In addition, the power source of the amplifier 32 of the amplifier part 31 provides a positive and negative power source $+V$ and $-V$ other than the power source 5 in view of the above-mentioned connection and voltage variation, but this makes the apparatus complicated and expensive, and therefore it is preferable that one power source 5 can be used in common.

Figure 6:
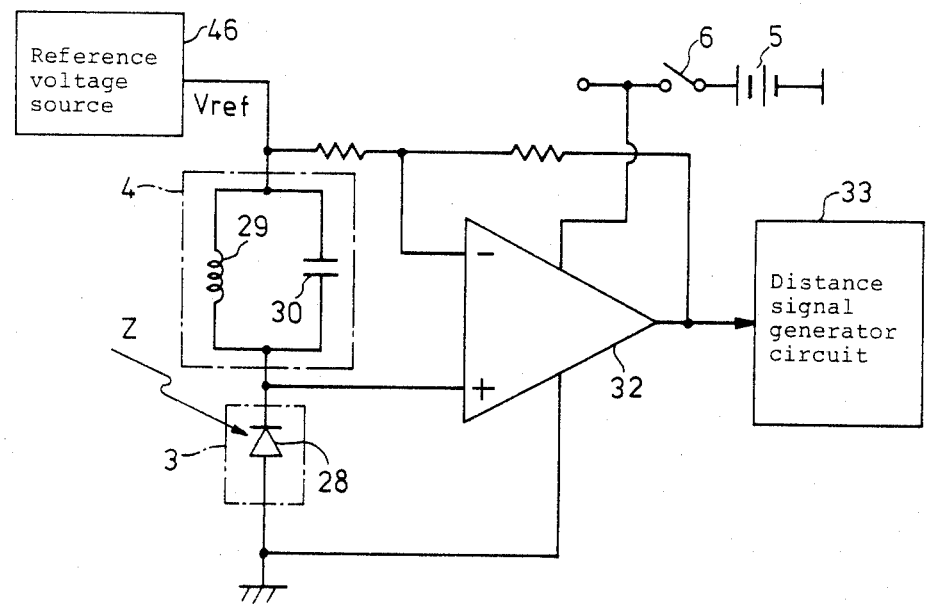
FIG. 6 shows an electric circuit of a light receiving side of the same embodiment.

FIG. 6 shows an electric circuit diagram, which is another embodiment wherein the above-mentioned problem is taken into consideration. In addition, needless to say, the circuit of the light transmitting side such as the light transmitter 1 or the like is omitted.

As is obvious from FIG. 6, such an embodiment has the amplifier 32 using the power source 5 as a drive source, and also provides, for example, a reference voltage source 46 generating a reference voltage $V_{ref}$ without voltage variation which is obtained very simply by an IC circuit based on the voltage of the power source 5, and also the relation of connection of the light receiver 3 and the tuning means 4 to the high potential side of the above-mentioned reference voltage source 46 which is part of the power source of the light transmitting side is reverse to the embodiment as shown in FIG. 2.

Consequently, the amplifier 32 is operated with the reference voltage $V_{ref}$ centered, that is, it is operated with the reference voltage $V_{ref}$ set as an apparent zero level, and therefore, for example, if the reference voltage $V_{ref}$ is set to about one-half the voltage of the power source 5, no problem of variation of the voltage of the power source 5 occurs. That is, if the voltage of the power source 5 is 3 V, by setting the reference voltage $V_{ref}$ to about 1.2 V–1.5 V, the light receiving side as illustrated is not affected at all even if the above-mentioned 3 V is varied, for example, to 2.7 V.

As has been described above, one embodiment of the distance measuring method and the optical distance meter in accordance with the present invention continuously varies the transmitted light frequency of an infrared light beam transmitted to an object within a predetermined frequency band, and also processes a light receiving signal of the light receiver responding to the light reflected from the object by employing the tuning means having frequencies as a resonance frequency capable of resonating with an arbitrary frequency included within the above-mentioned predetermined frequency band. And therefore, it can utilize the resonance operation very effectively without need of a complicated frequency matching between the light transmitting side and the light receiving side, and accordingly, has a great effect that the distance can be measured with a good precision up to a large distance even if the light transmission energy is small, for example, like the LED.

In other words, by applying the present embodiment, a great effect in practical use can be expected such that in the distance measuring means of the received light intensity detecting system, for example, the LED which is a very general infrared light source being small-sized and economical and has a small light emitting energy can be used practically, that is, a practical use without fail can be realized by using the LED.

Hereinbefore, description has been made on several embodiments which analogically varies the transmitted light frequency of the light transmitter by directly utilizing the charging/discharging characteristics of capacitor. And now, operation of the oscillation circuit as shown by drawing number 11 in the previous embodiment is elucidated in detail.

The oscillation circuit 11 in the above-mentioned embodiment, as is obvious from the drawing and the like, is constituted with an astable multivibrator circuit.

For this reason, when the potential at the point C being an input terminal draws near the potential at which either of the transistors 18 and 19 becomes conductive, an abnormal oscillatory operation takes place.

For example, in the embodiment wherein the oscillation frequency is controlled by the charging characteristic of the capacitor 23 as shown in FIG. 2, charging of the capacitor 23 is started at the time $t_1$ when the start switch 27 is turned on, and the charging voltage rises and an abnormal oscillatory operation takes place before the voltage value higher than the conducting voltage of the transistor 18 or 19 is reached, that is, before the time $t_2$ when either of the transistors becomes conductive.

In reverse, in an embodiment utilizing the discharging characteristic of capacitor for controlling the oscillation frequency, the same state as in the above-mentioned case appears after a normal oscillatory operation ends, and therefore unabnormal oscillatory operation takes place.

Figure 7:
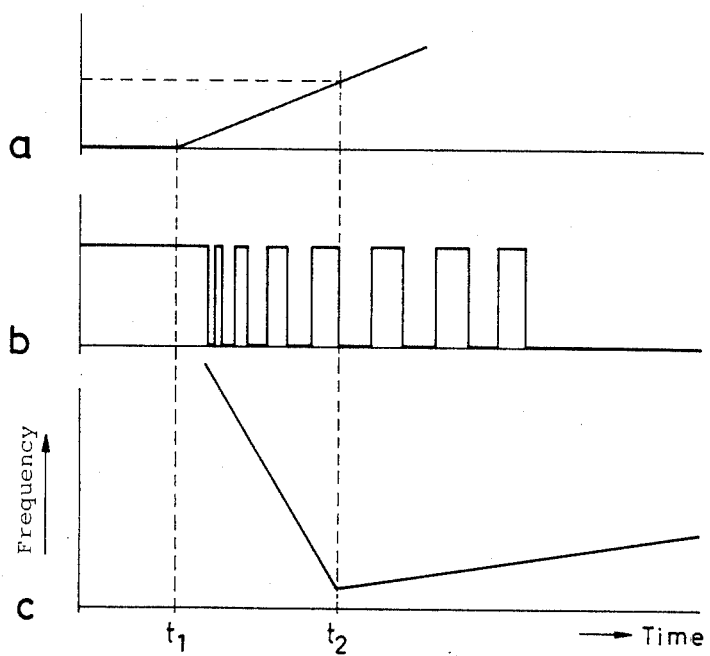
FIG. 7 shows graphs of, respectively, a charged voltage of a capacitor 23, an output of an oscillation circuit 1 and a frequency characteristic of a light transmitter 1 from a time $t_1$ when a start switch 27 is turned on to a time $t_2$ when either of transistors 18 and 19 has a full conduction in the embodiment as shown in FIG. 2, FIG. 5 and FIG. 6.

Graphs a, b and c of FIG. 7 microscopically show the above-mentioned abnormal oscillatory operation from the time $t_1$ to the time $t_2$ in the embodiment as shown in FIG. 2.

That is, when the charging voltage of the capacitor 23 as shown by graph a is supplied to the point C in the embodiment as shown in FIG. 2, a signal as shown by graph b appears at the point D of the output terminal of the oscillation circuit 11 before the time $t_2$ when the potential $V_1$ at which either of the transistors 18 and 19 becomes conductive is reached, and at this time, the characteristic of oscillation frequency becomes as shown by the graph c of FIG. 7.

In addition, it is needless to say that in the embodiment utilizing the discharging characteristc of capacitor, an operation quite reverse to the state as shown in FIG. 7 takes place after normal oscillatory operation Now, when explained by the characteristics in FIG. 7, the above-mentioned abnormal oscillatory operation is an operation which falls quickly from the high frequency region to the low frequency region, and a frequency resonating with the resonance frequency of the tuning means 4 is considered to exist, which has an adverse effect upon the distance measuring operation, that is, as the case may be, a signal not corresponding to the distance to the object X might be detected, and therefore it is desirable to make some provision for the above-mentioned abnormal oscillatory operation when putting the previously-described embodiment into practice.

Figure 8:
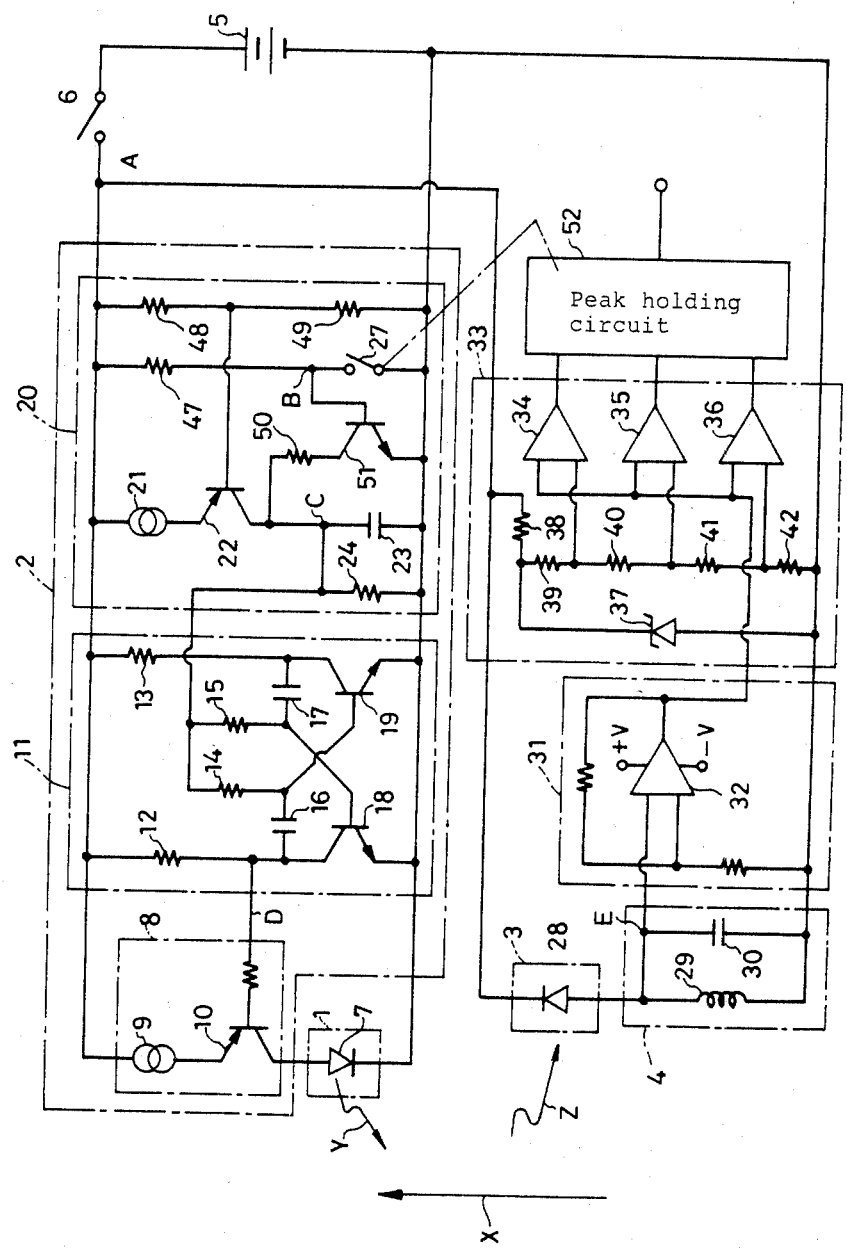
FIG. 8 is an electric circuit diagram showing another embodiment of an optical distance meter in accordance with the present invention.

FIG. 8 is an electric circuit diagram showing another embodiment of the optical distance meter utilizing the received light intensity detecting system in accordance with the present invention wherein the above-mentioned abnormal oscillatory oscillation is taken into consideration, and in the diagram, the same drawing number as that in FIG. 2 designates the part having the same function.

In FIG. 8, drawing numbers 47, 48, 49 and 50 designate resistors, number 51 designates a transistor as a switching element, and number 52 shows a peak holding circuit which is operation-controlled in interlocking with the operation of the start switch 27, and this peak holding circuit 52 holds a peak value of the signal output from the distance signal generator circuit 33.

This embodiment as shown in FIG. 8 differs from the embodiment as shown in FIG. 2 only in the configuration of the control circuit 20 and the installation of the above-mentioned peak holding circuit 52 interlocked with the start switch 27, and the basic operation of measuring distance to the object X, that is, the operation of obtaining the signal of distance to the object X by analogically varying the transmitted light frequency of the light transmitter 1 and utilizing the resonance operation in a combination with the tuning means 4 is the same, and therefore operational description is made hereinafter with operations of the control circuit 20 and the like differing from those in FIG. 2 centered.

Figure 9:
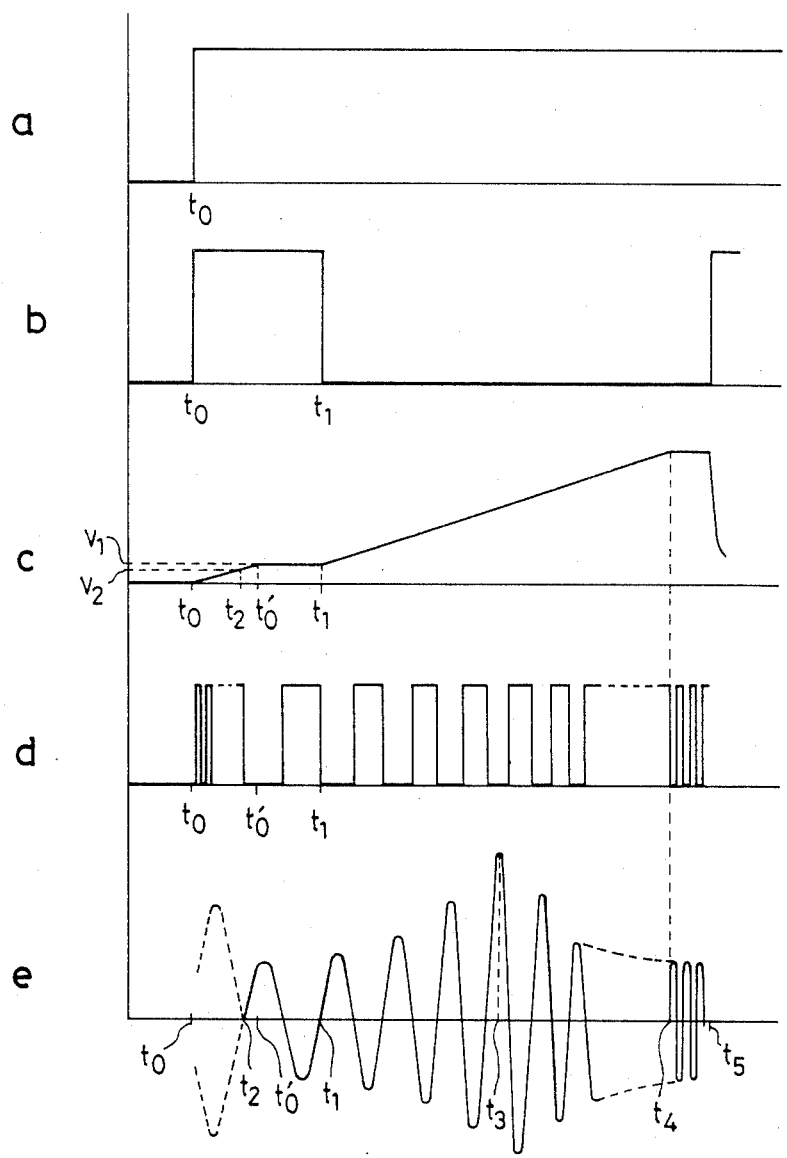
FIG. 9 is a graph of signal waveform at an arbitrary point in the circuit as shown in FIG. 8.

Now, when the power switch 6 is turned on at an arbitrary time $t_0$, likewise the embodiment as shown in FIG. 2, the voltage $+V$ of the power source 5 appears at a point A in FIG. 8 as shown by a graph a of FIG. 9, and this voltage is supplied to the drive circuit 8, the oscillation circuit 11, the control circuit 20 and the like, and these circuits are activated.

When the voltage $+V$ of the power source 5 appears at a point A in FIG. 8, the transistor 22 is put in a conductive state unlike the embodiment of FIG. 2, and the transistor 51 is put in a conductive state also.

When the transistors 22 and 51 become a conductive state, a current is supplied to the capacitor 23 and the resistor 50 from the second constant current source 21 through the transistors 22 and 51, and accordingly the capacitor 23 is charged to a voltage $V_1$ which determined by the resistor 50 and the second constant current source 21, and thereafrer the terminal voltage thereof is maintained at the above-mentioned voltage value $V_1$ until a point B in FIG. 8 becomes the low level and the transistor 51 becomes a non-conductive state as shown by a graph b of FIG. 9 by turning on the start switch 27 at a time $t_1$.

In addition, taking the time when the above-mentioned voltage $V_1$ is reached as $t_0'$, the state of terminal voltage of the capacitor 23 after a time $t_0$ when the power switch 6 is turned on as described above is shown from the time $t_0$ to the time $t_1$ in a graph c of FIG. 9 showing the potential of a point C in FIG. 8.

Then, when the start switch 27 is turned on to perform a distance measuring operation at the time $t_1$ after the time $t_0'$ when the potential of the point C is maintained at $V_1$, as is described above, the potential of the point B in FIG. 8 which is held at the high level after the time $t_0$ falls to the low level as shown by the graph b of FIG. 9, and therefore, the transistor 51 which has been in a conductive state is put in a non-conductive state.

When the transistor 51 is put in a non-conductive state, the resistor 50 is separated from a charging loop of the capacitor 23, and accordingly, the charging of capacity 23 with a constant current is started by a current supplied from the second constant current source 21 through the transistor 22 without limited by the resistor 50 after the above-mentioned time $t_1$.

As a result, the charging voltage of the capacitor 23, that is, the potential of the point C in the graph rises gradually from the above-described voltage $V_1$ as shown by the graph c of FIG. 9 after the time $t_1$ when the start switch 27 is turned on.

On the other hand, the above-mentioned charging voltage of the capacitor 23, as is explained in FIG. 2, is supplied to the oscillation circuit 11 and controls the operation thereof, and also the voltage from the time $t_0$ to the time $t_1$ in the present embodiment is not an exception.

Accordingly, for example, if the above-described voltage value $V_1$ in the present embodiment is set to a value larger than a conducting voltage $V_2$ of the transistor 18 or 19 in the oscillation circuit 11, either of the abovementioned transistors 18 and 19 is put in a fully conductive state at the time $t_2$ immediately before the time $t_0'$, thereafter an oscillatory operation wherein the both repeat conduction and non-conduction alternately is started. In addition, the time $t_2$ in FIG. 9 precedes the time $t_1$, but is designated by the same code as that in FIG. 3 because of the time when either of the transistors 18 and 19 becomes conductive as described in FIG. 3.

Furthermore, at this time, an abnormal oscillatory operation which occurs because the oscillation circuit 11 is constituted with, that is, in the embodiment of FIG. 2 as described in FIG. 7, an astable multivibrator is performed, the abnormal oscillatory operation that has occurred from the time $t_1$ when the start switch 27 is turned on to the time $t_2$ when either of the transistors 18 and 19 becomes a fully conductive state and a normal oscillatory operation is started is performed also.

In other words, in the embodiment as shown in FIG. 8, if the charging voltage value $V_1$ of the capacitor 23 charged by turning on the power switch 6 is set, for example, to a higher value than the conducting voltage value $V_2$ of the transistor 18 or 19, an abnormal oscillatory operation is performed before the time $t_0'$ when the charging voltage value reaches $V_1$, that is to say, unlike the embodiment in FIG. 2, before the distance measuring operation preceding the turn-on of the switch 27.

As a result, as shown in FIG. 8, if the operation of forming the distance signal is controlled in such a manner that the operation of the peak holding circuit 52 performing a holding operation of the distance signal supplied from the comparators 34, 35 and 36 in interlocking with the operation of the start switch 27 or the like, an adverse effect due to the above-described abnormal oscillatory operation can be neglected, and thereby an operation extremely suitable for practical use can be expected.

Furthermore, when observing the real operation in detail, the previously-described abnormal oscillatory operation has little effect upon the distance measuring operation if the time thereof is very short even if assumed to be performed during the distance measuring operation. Accordingly, in the above description, a case was supposed where the charging voltage value $V_1$ of the capacitor 23 is set to a value higher than the conducting voltage $V_2$ of the transistor 18 or 19, but even if a value lower than $V_2$ is set, if the value is near $V_2$, the time from turning on the start switch 27 to reaching $V_2$ for starting the distance measuring operation becomes extremely short, and therefore there is no problem in practical use, that is, most of abnormal oscillatory operation in not performed before the start switch 27 is turned on, and like the previous case, an adverse effect due to an abnormal oscillatory operation can be eliminated.

Now, in the oscillatory operation of the oscillation circuit 11 responding to the charging voltage value of the capacitator 23, a normal oscillatory operation is performed immediately before the time $t_0'$ when the charging voltage value becomes $V_1$ in the case where $V_1 > V_2$, and next, such a normal oscillatory operation is described briefly.

First, before the time $t_1$ when the start switch 27 is turned on, as described in the explanation of FIG. 2, charging through the resistors 12 and 13 and charging through the resistors 14 and 15 of the capacitors 16 and 17 of the oscilation circuit 11 is always performed by a charging current condition because of the power source 5 which is an energy source having a constant voltage and the charging voltage of the capacitor 23 which can be assumed to be nearly $V_1$.

Accordingly, the period of repetition of conduction and non-conduction of the transistors 18 and 19 of the oscillation circuit 11 becomes a predetermined constant period.

Next, description is made on an oscillatory operation after the time $t_1$ when the start switch 27 is turned on. In such a case, among the above-described ways of charging the capacitors 16 and 17, in the charging operation through the resistors 12 and 13, like the above-described case, the energy source is the power source 5 and the operation is performed by a constant charging current, but in the charging through the resistors 14 and 15, the energy source is the charging voltage of the capacitor 23 which rises gradually from the voltage value $V_1$ at the point C in FIG. 8 after the time $t_1$ as shown by the graph c of FIG. 9, and therefore the operation is performed by a charging current which is gradually increased.

For this reason, the period of repetition of conduction and non-conduction of the transistors 18 and 19, that is, the oscillatory operation of the oscillation circuit 11 varies continuously from the low frequency to the high frequency.

Accordingly, to the output terminal D of the oscillation circuit 11, an output signal as shown by the waveform d of FIG. 9 is output, in combination with the above-described abnormal oscillatory operation, and the output signal is supplied to the drive circuit 8.

In addition, when the above-mentioned charging voltage of the capacitor 23 reaches the saturation region, the oscillation frequency is stabilized as shown at the time $t_4$ and $t_5$ in the graph c of FIG. 9, and such a control is not required.

Hereinbefore, description is made on operations of the control circuit 20 and the oscillation circuit 11 in the embodiment as shown in FIG. 8, and operations of other circuits based on these circuits 20 and 11 have the same configuration as those of the embodiment as shown in FIG. 2 except for the peak holding circuit 52, and of course become the same operations as those of the embodiment in FIG. 2.

That is, the drive circuit 8 is operated by receiving an output signal at the output terminal D of the oscillation circuit 11, and the transistor 10 performs conductive and nonconductive operations in response to the signal as shown by the graph d of FIG. 9.

When the drive circuit 8 performs the operation as described above, the LED of the light transmitter 1 transmits an infrared light beam modulated with a signal as shown by the graph d of FIG. 9 toward the object X, and the light receiver 3 receives the light beam reflected by the object X.

The light receiver 3 supplies the tuning means 4 with the light receiving current responding to the level of reflected light which is received, and the tuning means 4 outputs an output voltage as shown by a waveform e of FIG. 9 to a point E in FIG. 8. In addition, the time $t_3$ of the waveform e of FIG. 9 is a time at which a resonance oscillation has been performed. Also, sometimes a resonance operation is performed even during the above-described abnormal oscillatory operation, but the operation is performed before turning on the start switch 27 which provides the time of starting the distance measurement, and therefore it can be neglected although shown by dashed lines in the waveform e of FIG. 9.

Output of the tuning means 4 is supplied to the comparators 34, 35 and 36 of the distance signal generator circuit 33 through the amplifier part 31, converted into a proper distance signal and held by the peak holding circuit 52, and thereby it is properly employed, for example, as a signal for automatic focus adjustment of camera or the like, that is, to meet a desired purpose.

As is described above, the above-mentioned embodiment, different from the embodiment shown in FIG. 2, controls the charging characteristics of the capacitor 23 for controlling operation of the oscillation circuit 11, so that the above-mentioned oscillation circuit 11 will fully or nearly complete an abnormal oscillatory operation before the start switch 27 is turned on, and also holds the distance signal to be used for various purposes by the peak holding circuit 52 interlocked with the operation of the start switch 27, therefore being a practical embodiment which can neglect the effect of the above-mentioned abnormal oscillatory operation.

Furthermore, although the peak holding circuit 52 in FIG. 8 is described as a circuit which holds the output state of the comparators 34, 35 and 36, needless to say, it can be replaced, for example, with a circuit which is intended to hold a maximum value among the output of the amplifier part 31, that is, a maximum value of output signal of the tuning means 4.

Figure 10:
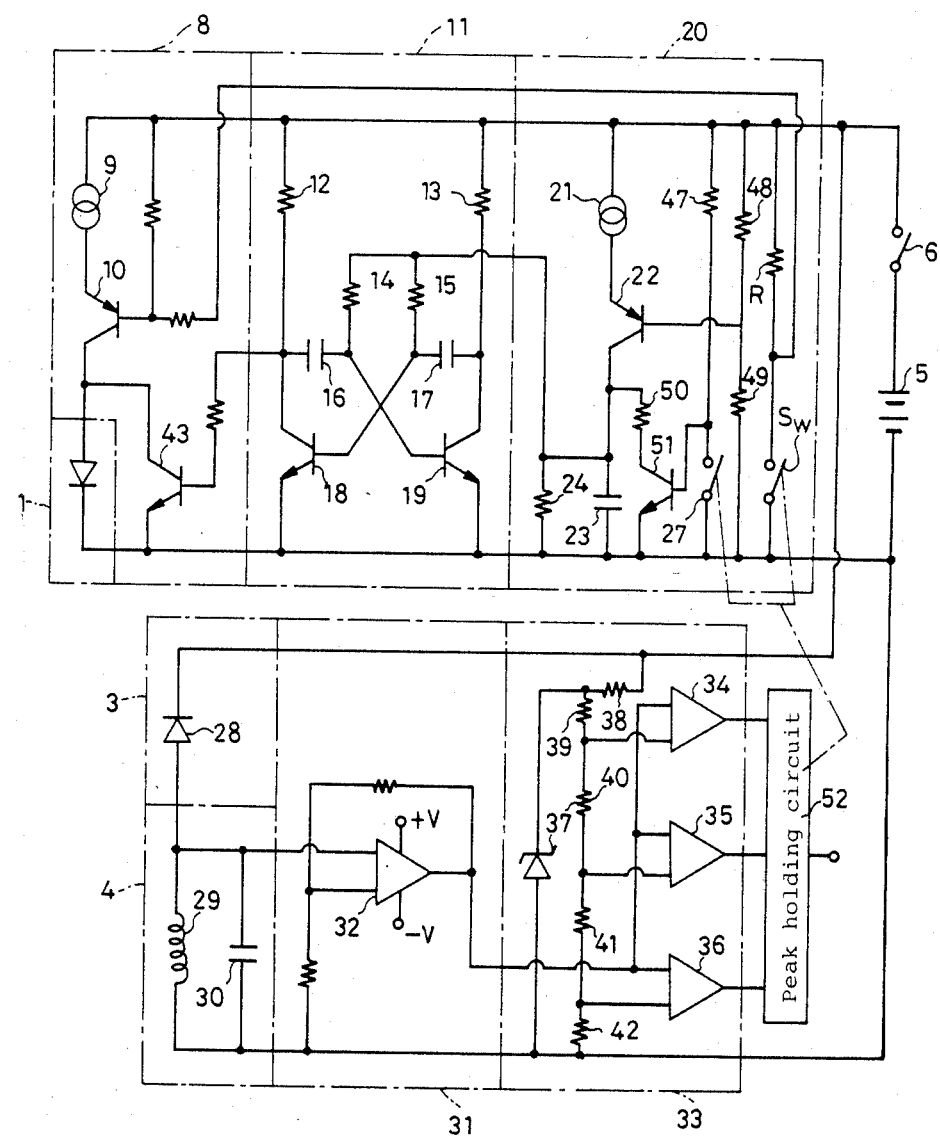
FIG. 10 is an electric circuit diagram showing still another embodiment of the optical distance meter in accordance with the present invention.

Furthermore, the embodiment as shown in FIG. 8 is an example which provides the control circuit 20 wherein the abnormal oscillatory operation is taken into consideration based on the embodiment as shown in FIG. 2, but needless to say, as shown in FIG. 10, the above-mentioned control circuit 20 as shown in FIG. 8 can be constituted based on the embodiment as shown in FIG. 4.

That is to say, also in the embodiment as shown in FIG. 4, wherein the control of the light transmitter 1 is performed by bypassing or non-bypassing the current supplied to the light transmitter 1, the control circuit 20 as shown in FIG. 8 is applicable. Such application is made such that a pulse output of the oscillation circuit 11 is supplied to the transistor 43 of the drive circuit 8, and that, a series connection of a resistor R and a switch SW is connected across the power source, and for example, the base of the transistor 10 is connected to the junction point of a resistor R and a switch SW of the series-connection unit composed of the resistor R and the switch SW, which is interlocked with the switch 27 for determining the starting time of distance measurement and simultaneously performs "make" operation and is connected to both ends of the power source through the power switch 6, so that the above-mentioned transistor 10 is put in a conductive state first when starting the distance measurement. And thus the control circuit 20 as shown in FIG. 8 wherein the abnormal oscillatory operation is taken into consideration can be applied.

In addition, operation of an embodiment as shown in FIG. 10 differs from those of the embodiments as shown in FIG. 4 and FIG. 8 only in that, as described above, the transistor 10 becomes conductive when the distance measurement is started by the resistor R and the switch SW interlocked with the start switch 27, and detailed description is omitted.

Figure 11A:
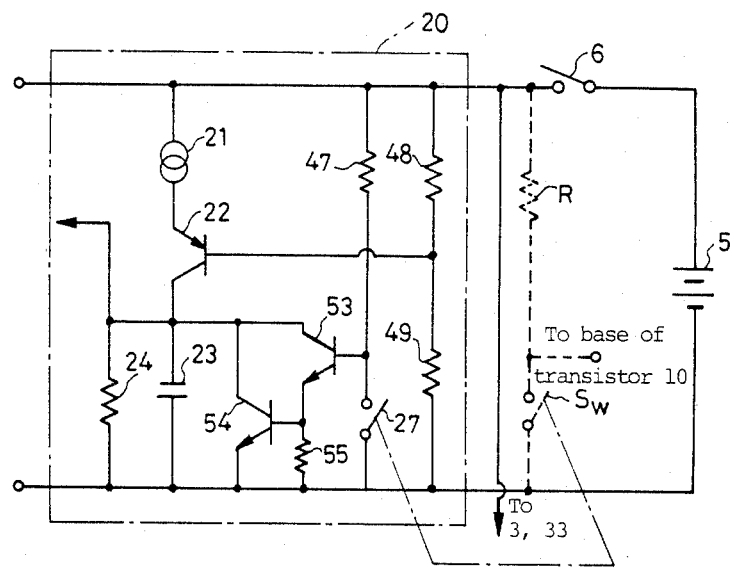
FIG. 11(a) and FIG. 11(b) show electric circuit diagrams showing still another embodiment of a control circuit as shown by the drawing No. 20 in each embodiment.
Figure 11B:
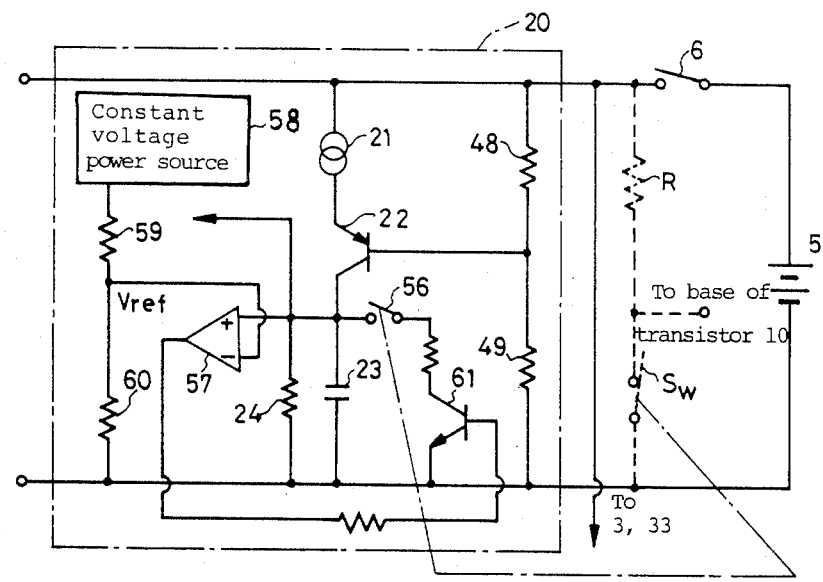

FIG. 11(a) and FIG. 11(b) are electric circuit diagrams showing other embodiments of the control circuit 20 in the embodiment as shown in FIG. 8 wherein abnormal oscillatory operation is taken into consideration, and in the diagrams, a part designated by the same numeral as that in FIG. 8 is a part having the same function, and in FIG. 11(a), numerals 53 and 54 designate transistors and numeral 55 designates a resistor, and in FIG. 11(b), numeral 56 designates a control switch which is turned on simultaneously with turning-on of the power switch 6 and is opened when a distance measuring operation is started, numeral 57 designates a comparator, numeral 58 designates a constant voltage power source, numerals 59 and 60 designate resistors which set the reference voltage of the comparator 57 together with the constant voltage power source 58, and numeral 61 designates a transistor. In addition, a terminal of the point of connection of the resistor R and the switch SW as shown by dashed lines in the drawing is a terminal which is connected to the transistor 10 when applied to the embodiment as shown in FIG. 4 like FIG. 11(a) for FIG. 8.

These two embodiments, as is obvious from the diagrams, differ from the embodiment in FIG. 8 in the method of setting the voltage value corresponding to the charging voltage value $V_1$ of the capacitor 23 before the distance measuring operation as explained in FIG. 8.

That is, in the embodiment as shown in FIG. 11(a), when the power switch 6 is turned on, the transistors 22, 53 and 54 are put in a conductive state, and accordingly, the capacitor 23 is charged to a voltage value which is determined by a voltage $V_{BE(54)}$ between the base and the emitter of the transistor 54 and a voltage $V_{CE(53)}$ between the collector and the emitter of the transistor 53, for example, $V_1'$, thereafter being kept at the above-mentioned voltage value $V_1'$ until the start switch 27 is turned on like the case of FIG. 8.

Like the voltage value $V_1$ as described in the operational explanation of, FIG. 8, the above-mentioned voltage value $V_1$, needless to say, is set to a value higher or slightly lower than the conducting voltage $V_2$ of the transistors 18 and 19 of the oscillation circuit 11, and in other words, in the embodiment as shown in FIG. 11(a), the charging voltage value of the capacitor 23 which is determined by the resistor 28 and the second constant current source 21 in FIG. 8 is determined by the above-mentioned $V_{BE(54)}$ and $V_{CE(53)}$.

For this reason, an advantage can be expected that when the characteristic of the transistor 54 is made to agree with those of the transistors 18 and 19 of the oscillation circuit 11, operation can follow a variation of the conducting voltage $V_2$ due to a change in temperature.

In addition, needless to say, operations of the circuits omitted in the embodiment of FIG. 11(a) are not explained since they are the same as those in the embodiment of FIG. 8.

Next, in an embodiment as shown in FIG. 11(b) when the power switch 6 is turned on, the transistor 22 is put in a conductive state, and charging of the capacitor 23 is started, and also the control switch 56 is turned on.

Accordingly, when the charging voltage of the capacitor 23 exceeds a reference voltage value $V_3$ which is determined by the constant voltage power source 58 and the resistors 59 and 60, the comparator 57 is operated and the transistor 61 is put in a conductive state, and thereby the charging current of the capacitor 23 supplied from the second constant current source 21 through the transistor 22 is bypassed.

As a result, the above-mentioned charging voltage value of the capacitors 23 is maintained at the above-mentioned reference voltage value $V_3$ of the comparator 57, and, of course, this reference voltage value $V_3$ is set similarly to the voltage value $V_1$ or $V_1'$ as described before. Particularly, in the embodiment as shown in FIG. 11(b), the charging voltage value before turning-off the control switch 56 of the capacitor 23 is controlled by the operation of the comparator 57, and resultingly an extremely accurate setting can be performed, and thereby an advantage of reducing an improper operation due to scattering of characteristics of elements can be expected.

In addition, also in this embodiment, operations of omitted parts after turning-off of the control switch 56 are the same as those after turning-on the start switch 27 in FIG. 8, and therefore description thereof is omitted.

FIG. 12(a) and FIG. 12(b) are electric circuit diagrams showing still other embodiments of the control circuit 20 in the embodiment as shown in FIG. 8 like FIG. 11(a) and FIG. 11(b).

In the diagrams, a part designated by the same numeral as that in FIG. 8 is a part having the same function, and numeral 62 designates a third constant current source, numeral 63 designates a resistor for charging and 64 designates a switch which is closed by turning on the power switch 6 and opened by turning on the start switch 27. Also, a terminal of the point of connection of the resistor R and the switch SW as shown by a dashed line in the diagram, like FIG. 11(a) and FIG. 11(b), is a terminal which is connected to the transistor 10 when applied to the embodiment as shown in FIG. 4.

The embodiments as shown in FIG. 12(a) and FIG. 12(b) are both intended to shorter the period from the time when the power switch is turned on to the time when the charging voltage reaches the predetermined voltage $V_1$ or $V_1'$ or $V_3$ which is higher than the conducting voltage $V_2$ of the transistor 18 or 19 of the oscillation circuit 11, that is, the period from the time $t_0$ to the time $t_0'$ as shown in FIG. 9c in the charging characteristics of the capacitor 23 in each embodiment as described before.

First, in the embodiment in FIG. 12(a), when the power switch 6 is turned on, the switch 64 is turned on, and also the transistors 22 and 51 are put in a conductive state as described in FIG. 8, and thereby the capacitor 23 is charged by constant currents $I_{21}$ and $I_{62}$ from the second and third constant current sources 21 and 62.

At this time, by setting the relation between the above-mentioned constant currents $I_{21}$ and $I_{62}$ to $I_{2-1} < < I_{62}$, the above-mentioned charging characteristic of the capacitor 23 can be made sharper in comparison with the case of charging only by the second constant current source 21 as described in FIG. 8.

Next, in the embodiment as shown in FIG. 12(b), like FIG. 12(a), when the power switch 6 is turned on, the capacitor 23 is charged not only by the constant current $I_{21}$ of the second constant current source 21 but also by a current supplied from the power source 5 through the resistor 63 for charging, and of course the charging characteristic of the capacitor 23 becomes sharp also in this case.

As a result, in the embodiments as shown in FIG. 12(a) and FIG. 12(b), an advantage of shortening the time of accurate distance measuring operation, that is, the period from the time $t_0$ to $t_5$ in FIG. 9 can be expected, for example, in the case where the power switch 6 is also controlled in association with distance measuring operation to prevent the power source 5 from wasting power.

In addition, needless to say, the embodiment of FIG. 12(a) or FIG. 12(b) can be used by a suitable combination with the embodiment as shown in FIG. 11(a) or FIG. 11(b).

Figure 13:
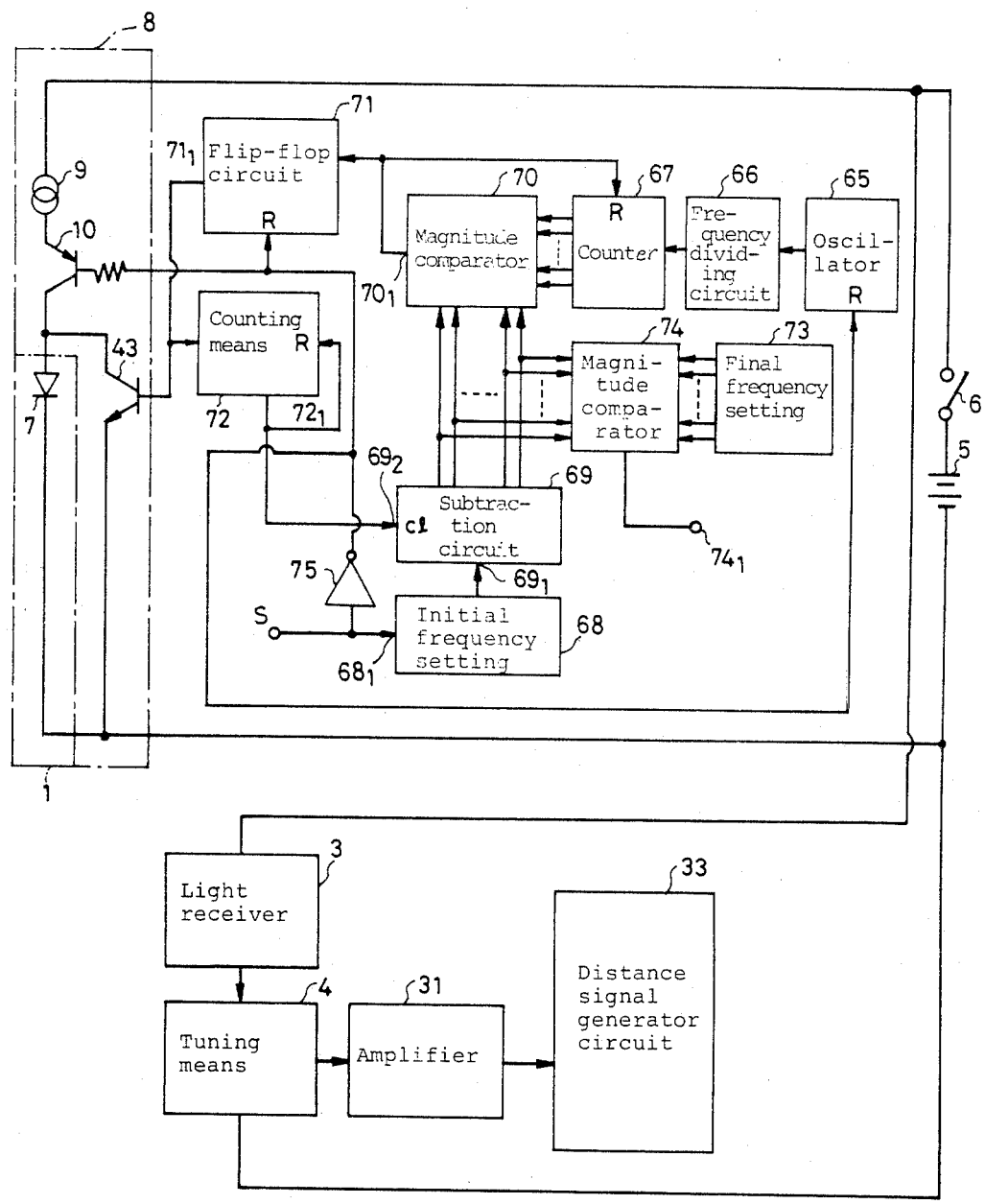
FIG. 13 is a block diagram showing still another embodiment of the optical distance meter in accordance with the present invention.

FIG. 13 is a block diagram showing still another embodiment of an optical distance meter utilizing a received light intensity detection system in accordance with the present invention.

All the embodiments as described before vary the transmitted light frequency by means of analog processing using the charging voltage of the capacitor 23, while this embodiment varies it by means of digital processing.

Figure 14:
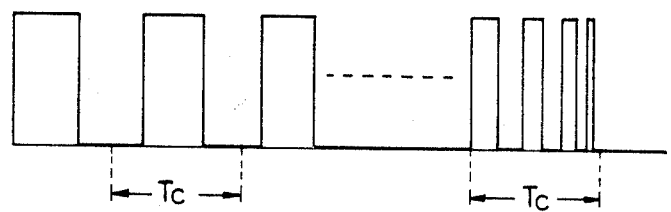
FIG. 14 is a signal diagram for explaining that the number of pulse signals generated within a predetermined time in a pulse signal train wherein the frequency is varied in an analog fashion in the low frequency region differs from that in the high frequency region.

When the transmitted light frequency is varied by analog processing, as shown in FIG. 14, the number of pulse signals of an arbitrary frequency and variable frequency near it included in an arbitrary constant period $T_c$ becomes small in the low frequency region and becomes large in the high frequency region, and also the pulse signal capable of becoming resonance frequency is only one, if it would exist.

On the other hand, it is known that the intensity of resonance operation is not stabilized if the pulse signals of resonance frequency are supplied by a number less than a predetermined number, and in reverse, if the pulse signals are supplied by a number exceeding a required number, the intensity is saturated.

Accordingly, in the configuration of varying frequency in the embodiments as described before, resonance is weak in the low frequency region and strong in the high frequency region.

As a result, when the resonance frequency is varied due to a change in the specifications for circuit components or environments, although resonance operation is sure to be performed, the intensity of resonance varies with the above-mentioned change, and, for example, it is considered that differences take place in the level of signals detected for objects of the same distance.

That is, for an optical distance meter of received light intensity detection system wherein the signal level through resonance operation is obtained as distance information, the embodiments as described before has no grave problem in practical use when applied to an apparatus for which distance information having some extent of scattering suffices such as the optical distance meter for compact camera, however, some provision is desired to be made in the case where more accurate distance information is required.

In an embodiment as shown in FIG. 13, the above-mentioned problem is taken into consideration, and in the diagram, a part designated by the same numeral as that in FIG. 2 is a part having the same function, and numeral 65 designates an oscillator which issues pulse signals of a predetermined frequency, numeral 66 designates a frequency dividing circuit which divides pulse signals issued from the oscillator 65 to generate reference clock signals, numeral 67 designates a counting circuit which counts the number of reference clock signals issued from the frequency dividing circuit 66.

Numeral 68 designates an initial frequency setting means which sets an initial frequency of transmitted light frequency to be varied, and outputs control digital signals for outputting digital signals indicating the number of the above-mentioned reference clock signals corresponding to the above-mentioned initial frequency to be set to a subtraction circuit 69 as described later by supplying a start signal to an input terminal $68_1$, that is, a distant measurement start signal which starts distance measuring operation.

Numeral 69 designates a subtraction circuit which outputs digital signals indicating the number of reference clock signals for setting the above-mentioned initial frequency by means of control digital signal output from the initial frequency setting means 68, and also subtracts from the digital signal in sequence by supplying a signal to a clock terminal $69_1$. Numeral 70 designates a magnitude comparator (hereinafter referred to as M comparator) which compares the number of signals of count output of the counting circuit 59 with that of subtraction output of the subtraction circuit 69, and outputs an equality pulse signal from an output terminal $70_1$ when the both signals are equal.

Numeral 71 designates a flip-flop circuit (hereinafter referred to as F.F circuit) which receives an equality signal output from the M comparator 70 and inverts the output state of an output terminal $71_1$.

Figure 12:
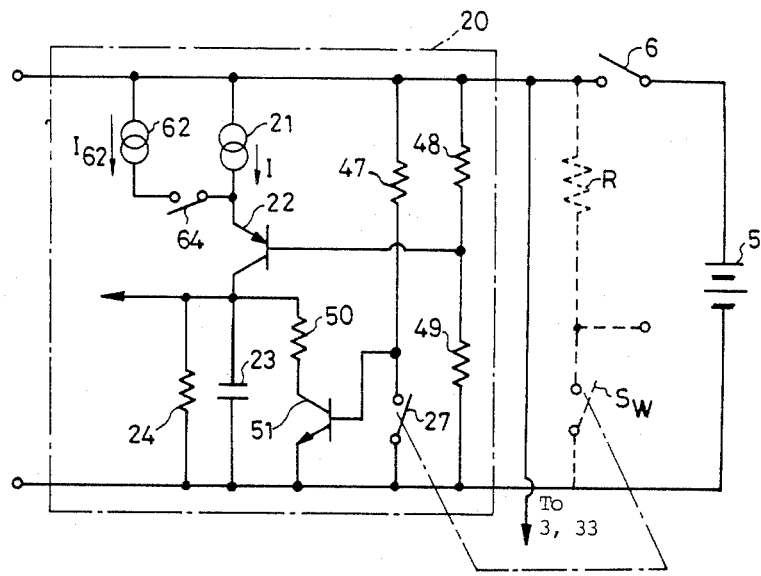
FIG. 12(a) and FIG. 12(b) show electric circuit diagrams showing still another embodiment of a control circuit as shown by the drawing No. 20 in each embodiment.
Figure 12:
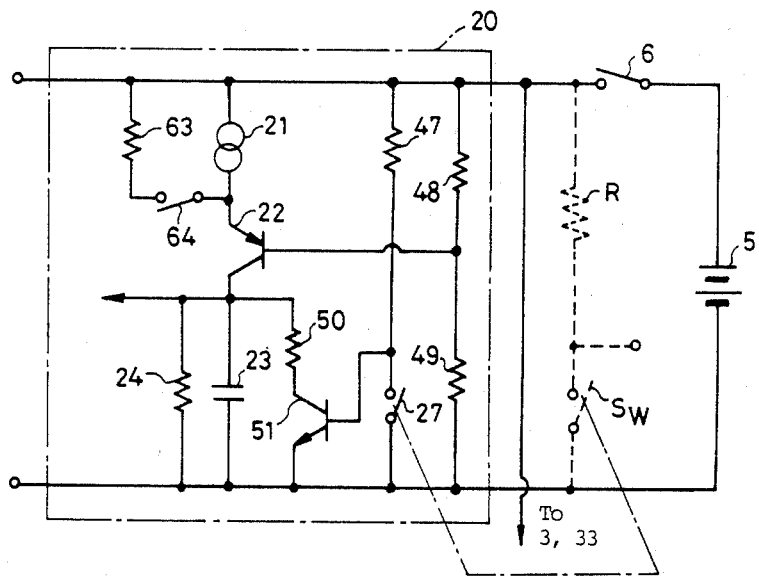

In addition, as obvious from FIG. 12, the output terminal $71_1$ of the above-mentioned F.F circuit 71, for example, is connected to the transistor 43 of the drive circuit 8 as shown in FIG. 4 to supply the output thereto.

Numeral 72 designates a counting means which counts an output signal inverting an output state of the F.F circuit 71, that is, rise or fall of the pulse signal, and outputs a control signal which controls operations of the subtraction circuit 69 and itself from an output terminal $72_1$ when the content of count becomes a predetermined number N.

Numeral 73 designates a final frequency setting means which sets the final frequency of transmitted light frequency to be varied, and numeral 74 designates an M comparator which compares an output signal of the final frequency setting means 73 with a subtraction output of the subtraction circuit 69, and outputs an operation end signal, that is, a signal which brings distance measuring operation to and end from an output terminal $74_1$ when the both outputs are equal.

Numeral 75 designates an inverter which releases a reset state of the F.F circuit 71, that is, puts the circuit in an operationable state by receiving a distant measurement start signal which starts a distance measuring operation by starting the operation of the initial frequency setting circuit 68.

As is obvious from the configuration as described above, such an embodiment is intended to achieve the functions of the oscillation circuit 11 and the control circuit 20 in the embodiment as explained previously, that is, the function of varying the transmitted light frequency by the configuration of setting degital frequency as designated by numeral 65 or 75, and hereinafter description is made on the operation thereof in reference to a graph of operational state in FIG. 15.

In a state wherein the power switch 6 is on, thereby supplying power to respective circuit from the power source 5, when a distance measurement start signal, which is a change from the high level to the low level made by turning on of the power switch 6 defining a starting of distance measuring operation, is supplied from a point s in the graph, this signal is supplied to the oscillation circuit 65 and the F.F circuit 71 through the inverter 75. This supply of signal releases a reset state of the both circuits, and also makes the initial frequency setting means 68 operate, and outputs a command signal for outputting a digital signal corresponding to an initial frequency $f_{n+1}$ which is determined, for example, by number $(n+1)$ of reference clock signals which is set by the setting means 68 itself, that is, a digital signal representing the above-mentioned number $(n+1)$ to the subtraction circuit 69.

Accordingly, the oscillation circuit 65 starts an oscillatory operation, and reference clock signals of a predetermined frequency as shown by FIG. 15a is output from the frequency dividing circuit 66, and the number thereof is counted by the counting circuit 67.

Furthermore, the F.F circuit 71 is put in an operation enable state wherein operation can be made by receiving an output signal from the M comparator 70, and the subtraction circuit 69 supplies M comparator 70 with, for example, a digital signal representing number $(n+1)$.

The M comparator 70 compares a count digital signal of reference clock signals of the counting circuit 67 with a digital signal corresponding to the initial frequency supplied from the subtraction circuit 69, and when the both equal, that is, when the counting circuit 67 counts number $(n+1)$ in the previous example, an equality output signal as shown by FIG. 15b is output from the output terminal $18_1$, being supplied to the F.F circuit 71 and the counting circuit 69.

The F.F circuit 71 performs an operation which inverts the output level thereof by receiving an output signal as shown by FIG. 15b, and outputs a signal as shown by FIG. 15c, and thus the output signal of the F.F circuit 71 is supplied to the drive circuit 8 and the counting means 72.

On the other hand, the counting circuit 67 resets the content of count till then by the above-mentioned equality output signal from the M comparator 70, and thereafter starts the counting operation again.

That is, in the previous example, the M comparator 70 outputs the equality output signal every time the counting circuit 67 counts reference clock signals of number $(n+1)$, and the F.F circuit 71, as is obvious from the relation of FIG. 15a and c, outputs a pulse output that an output state is inverted at a period determined by number $(n+1)$ of reference clock signals.

Accordingly, the drive circuit 8 controls operation of the light transmitter 1 in response to pulse signals of the F.F circuit 71, and the counting means 72 starts to count the above-mentioned pulse signals.

The counting means 72 outputs control signals of the subtraction circuit 69 and itself from the output terminal $72_1$ at a time when pulse signals as shown by FIG. 15c output from the F.F circuit 71 become a predetermined number N, and subtracts from the content of digital signal output from the subtraction circuit 69, and also resets the counting operation of its own.

That is, by supplying of control signal to a clock terminal $69_2$ from the counting means 72, the subtracting circuit 69 performs subtraction in a manner that the contents of digital signal representing the number (n+1) of reference clock signals which has been output till then is changed to n.

Accordingly, after the counting means 72 output a control signal, the M comparator 70 outputs an equality output signal at a time when the counting circuit 67 counts number (n) of reference clock signals which is one smaller than that in the above-described state like the state after a time Tn in FIG. 15b.

As a result, the F.F circuit 71 outputs pulse signals whose output state is inverted at a period of time shorter than that in the case of counting the above-mentioned number (n+1), that is, outputs pulse signals having a frequency $f_n$ higher than that in the previous case as shown by FIG. 15e.

In addition, counting operation of the above-mentioned pulse signals of higher frequency by the counting means 72 is the same as that in the previous case, and accordingly, needless to say, also in such a case, if the predetermined number N is counted, control signals controlling the subtracting circuit 69 and itself are output.

Thereafter, the operation as described above is repeated, and to be brief, the state of light transmission of the light transmitter 1 is controlled by a pulse signal train of the predetermined number N whose frequency becomes higher one by one of reference clock signal, that is, in the sequence of $f_{(n+1)}, f_{(n)}, f_{(n-1)} \ldots$, as shown by FIG. 15e.

On the other hand, a digital signal output from the subtracting circuit 69 is supplied to the M comparator 74, being compared with a signal corresponding to the final frequency set by the final frequency setting means 73.

That is, the final frequency setting means 73 has a function of outputting a digital signal corresponding to reference clock signals of arbitrary number which is the same function as those of the initial frequency setting means 68 and the subtraction circuit 69, and, for example, outputs a digital signal corresponding to number (n−x) equivalent to the final frequency.

Accordingly, by the operation as described above, the digital signal output from the subtracting circuit 69 is subtracted in the sequence of n, (n−1), (n−2) . . . from the state corresponding to the initial number (n+1), and the M comparator 74 is operated at a time $T_x$ when the signal becomes the state of number (n−x) and an operation end signal as shown by FIG. 15d is output from an output terminal $74_1$.

This operation end signal is a signal which terminates the distance measuring operation including the above-mentioned operation, that is, a series of distance measuring operations including operations of the light receiver 3, the tuning means 4 and the like though not described above, and puts each circuit and means in a state before the distance measurement start signal is supplied, and one cycle of distance measuring operation is completed by the above-described operation.

Figure 15:
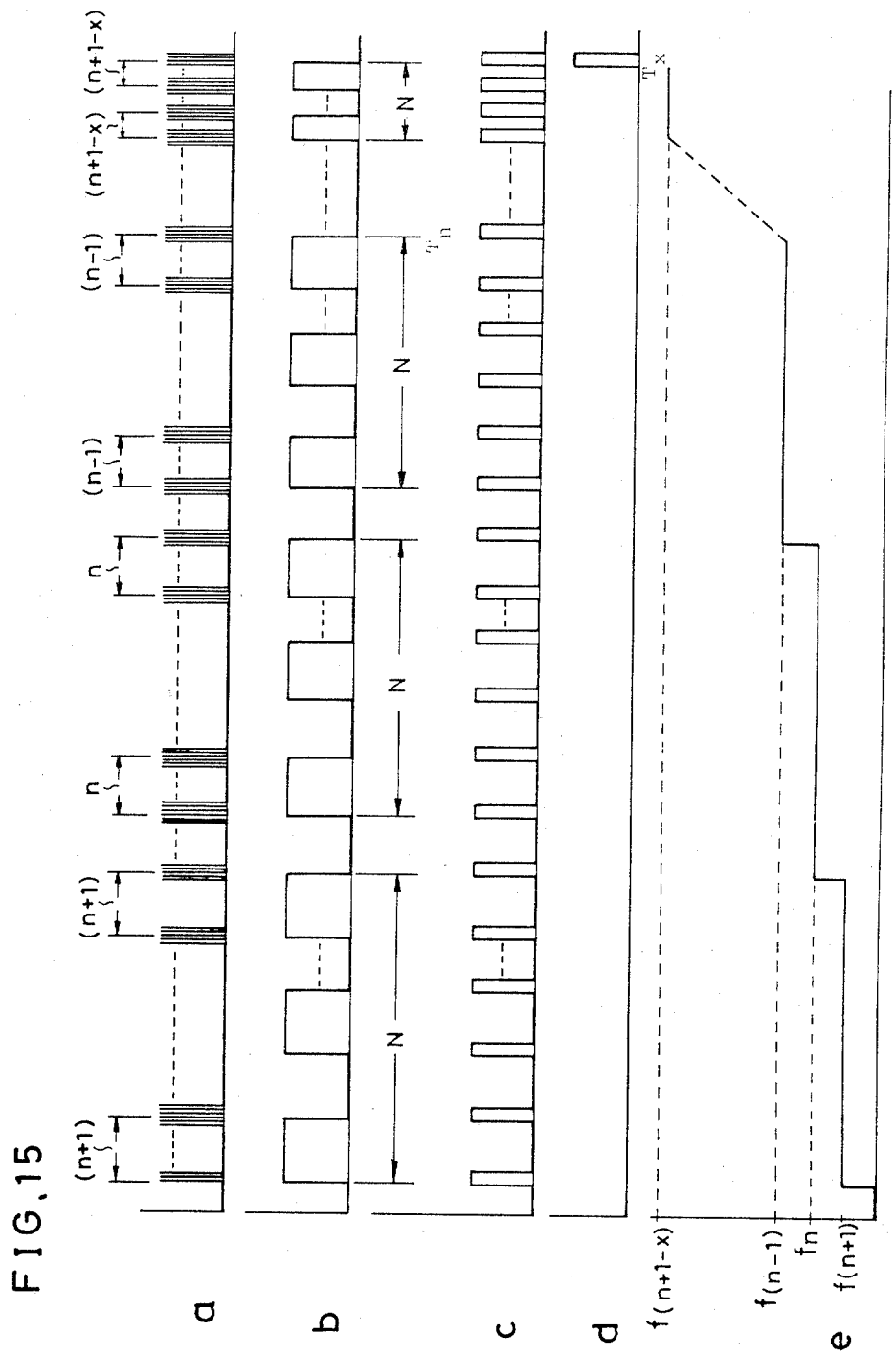
FIG. 15 is a graph of signal waveform at an arbitrary point in an embodiment as shown in FIG. 13.

As is obvious from the above description or signal waveforms shown by the waveforms a, b and c of FIG. 15, pulse signals from the F.F circuit 71 are such that the signal of the same frequency, that is, the signal that the number of reference clock signals is equal is output always by number N, and in addition, the frequency becomes higher one by one of reference clock signals every time the output of number N ends, and therefore the light transmitter 1 in the embodiment as shown in FIG. 13 has a digital characteristic of variable frequency of transmitted light frequency as shown by FIG. 15e.

Accordingly, by setting the predetermined number N which is the number of pulse signals output from the F.F circuit 71 as mentioned above to a number stabilizing the intensity of resonance, an inpropriety can be removed which occurs in the case where the transmitted light frequency is varied in an analog fashion.

Furthermore, in the embodiment as shown in FIG. 13, the subtraction circuit 69 is provided so that the transmitted light frequency of the light transmitter 1 will become higher gradually, but needless to say, the characteristics may be set so that the frequency will become lower gradually.

Furthermore, when a ceramic vibrator such as quartz or the like is used as a reference oscillation source of the oscillation circuit 65, there is need of considering scattering of the conducting voltage of transistor and change in temperature for stabilizing the oscillation frequency unlike the multivibrator using transistors, and the frequency becomes very stable, and also because of digital processing, the configuration of varing transmitted light frequency as described above can be formed by a microcomputer, and an extremely stable characteristics of variable frequency is obtainable also from this point.

Furthermore, needless to say, by increasing the frequency of reference clock signals, intervals of variable frequency can be reduced and apparently an analogical variable state is obtainable.

Also, if the control number of reference clock signals for varying frequency is limited to one which is a predetermined number as shown in the previous embodiment, the variable frequency characteristic becomes a small change in the low frequency region and a large change in the high frequency region, and a difference is considered to occur in the probability of resonance with an arbitrary frequency, and therefore, needless to say, it is desirable to give a consideration of varying frequency by the same frequency width such as increasing the control number of reference clock signals in the low frequency region or the like when putting into practice.

Figure 16:
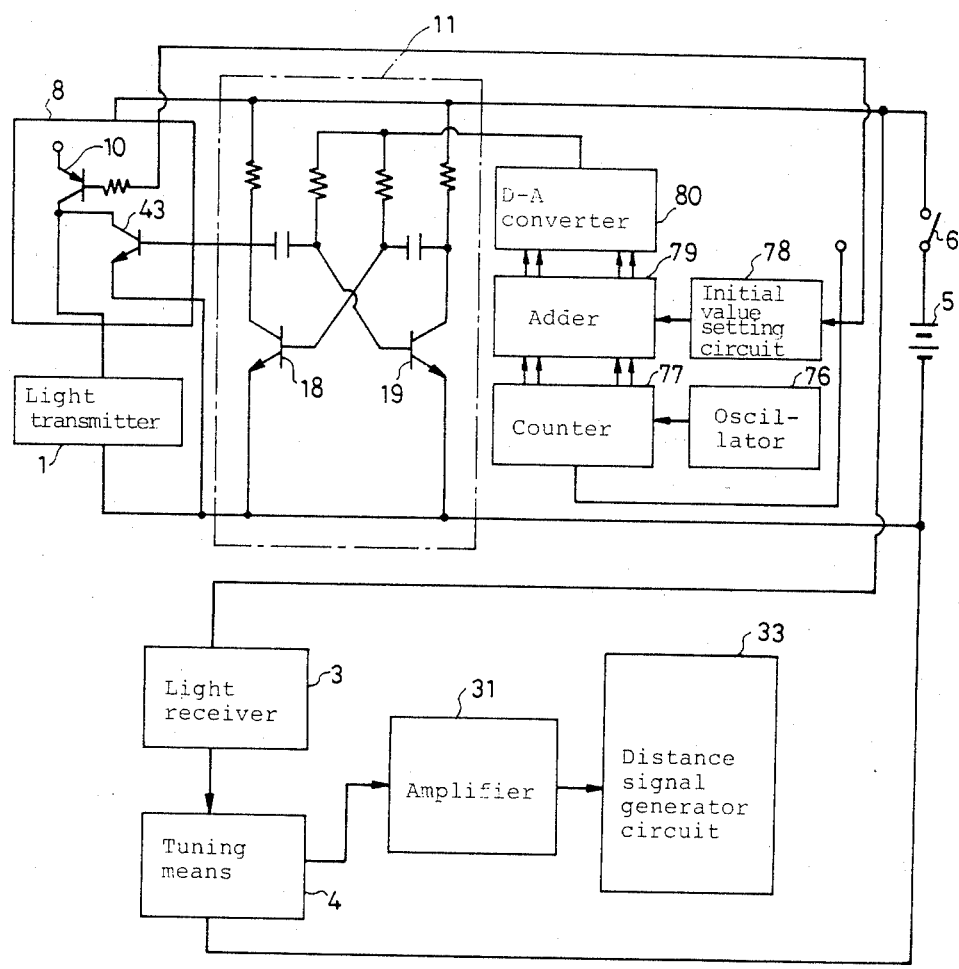
FIG. 16 is a block diagram showing still another embodiment of the optical distance meter in accordance with the present invention.

FIG. 16 is an electric circuit diagram showing still another embodiment of an optical distance meter in accordance with the present invention, which controls the transmitted light frequency of the light transmitter 1 in a digital fashion.

In the diagram, a part designated by the same numeral as that in FIG. 2, FIG. 13 or the like is a part having the same function, and numeral 76 designates an oscillation circuit which generates reference pulse signals every predetermined time T, and numeral 77 designates a counter which counts reference pulse signals generated by the oscillation circuit 76 by receiving the distance measurement start signal to an input terminal $77_1$ and forms different output states depending upon the state of count thereof.

Numeral 78 designates an initial value setting circuit which has an adder 79 set a digital signal corresponding to an initial voltage value $V_{A1}$ initially supplied to the oscillation circuit 11, numeral 79 designates an adder which outputs a digital signal corresponding to the above-mentioned initial voltage value $V_{A1}$ by the initial value setting circuit 78, and also varies the state of digital signal outputting corresponding to the output state of the above-mentioned counter 77, and numeral 80 designates a D-A converter which outputs an arbitrary voltage value responding to a digital signal of the adder 79, supplying it to the oscillation circuit 11.

Furthermore, the predetermined time T during which the above-mentioned oscillation circuit 76 outputs reference pulse signals, needless to say, should be set in a predetermined time in order that a stable intensity is obtained even in the low frequency region in the frequency band wherein the transmitted light frequency is varied. Such predetermined time should be, for example, longer than the time during which such number of pulse signals from the oscillation circuit 11 as the intensity of resonance is saturated is supplied to the drive circuit 8 of the light transmitter 1.

Also, the initial voltage value $V_{A1}$ set by an output signal from the initial value setting circuit 78 by means of the adder 79 and the D-A converter 80, needless to say, is set so as to be higher than the conducting voltage of the transistors constituting the oscillation circuit 11 to prevent an abnormal oscillatory operation of the oscillation circuit 11.

Hereinafter description is made on operation of the above-mentioned embodiment as shown in FIG. 16.

In a state where the power switch 6 is turned on and each circuit is supplied from the power source 5, when a distant measurement start signal is generated, the counter 77 and the initial value setting circuit 78 are put in an operational state, and the counter 77 starts to count pulse signals output from the oscillation circuit 76, and the initial value setting circuit 78 outputs a control signal which controls operation of the adder 79 so as to output a digital signal corresponding to the initial voltage value $V_{A1}$.

Accordingly, the D-A converter 80 instantly outputs the initial set voltage $V_{A1}$ to supply the oscillation circuit 11 with it.

That is, in the case of an embodiment as shown in FIG. 16, the voltage value $V_{A1}$ higher than the conducting voltage of the transistors forming part of the oscillation circuit 11 is supplied to the oscillation circuit 11 simultaneously with supplying of the distance measurement start signal, and consequently the oscillation circuit 11 starts an oscillatory operation at an initial frequency $f_{A1}$ responding $V_{A1}$, and thereby the light transmitter 1 performs a light transmitting operation whose transmitted light frequency is the above-mentioned initial frequency $f_{A1}$ by means of operation of controlling energy supply of the drive circuit 8 which is operation-controlled at the initial frequency $f_{A1}$ responding to the above-mentioned voltage value $V_{A1}$.

On the other hand, when the predetermined time T elaspes after the time when the above-mentioned initial voltage $V_{A1}$ is supplied, pulse signals are output from the oscillation circuit 76, and thereby the output state of the counter 77 is varied and the varied count output signal thereof is supplied to the adder 79.

Accordingly, the adder 79 outputs a digital signal different from the digital signal corresponding to the initial voltage value $V_{A1}$ which has been output till then, that is, a digital signal corresponding to a voltage value different from the above-mentioned initial voltage value $V_{A1}$, for example, $V_{A2}$.

The D-A converter 80, of course, outputs a voltage value different from the initial voltage value $V_{A1}$, for example, $V_{A2}$ on receiving the above-mentioned digital signal different from the initial value.

As a result, the oscillatory operation of the oscillation circuit 11 becomes an oscillation having a frequency different from the frequency $f_{A1}$ corresponding to the initial voltage value $V_{A1}$, for example, $f_{A2}$ corresponding to the above-mentioned voltage $V_{A2}$, and thereby the transmitted light frequency of the light transmitter 1 is also varied digitally from $f_{A1}$ to $f_{A2}$.

Thereafter, the digital output of the adder 79 by the above-mentioned change in the count output of the counter 77 is varied every time pulse signals are output from the oscillation circuit 76, that is, every time the predetermined period T elapses, and an operation of varying the voltage value output from the D-A converter 80 is performed, and the transmitted light frequency is varied in sequence based on such an operation.

Figure 17:
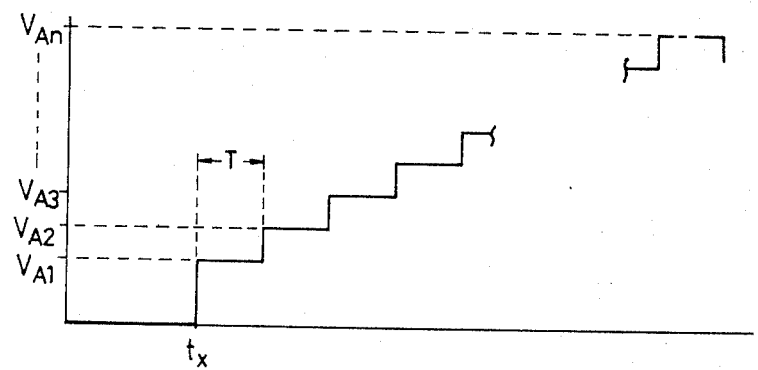
FIG. 17 is a signal diagram showing one example of the output state of a D-A converter in the embodiment as shown in FIG. 16.

In addition, an output voltage state of the D-A converter 80 in the above-described operation can be illustrated as shown in FIG. 17, an the characteristic thereof becomes a stepwise, namely, digital one, and accordingly, and the variation characteristic of the above-mentioned transmitted light frequency interlocked therewith naturally becomes a digital one also.

Also, one example as shown in FIG. 17 is an embodiment wherein the output voltage rises in the sequence of $V_{A2}$, $V_{A3}$ ... $V_{An}$ starting with the initial voltage $V_{A1}$ set as the lowest, and $t_x$ in the graph is a time when the distance measurement start signal is supplied.

Furthermore, needless to say, setting of the final voltage $V_{An}$ can be controlled by various means such that capacitance of the counter 77 or the adder 79 is controlled properly, or when a predetermined number of voltage varying operations are completed, each circuit is forcedly reset to an inoperable state, or the like.

Furthermore, without a need for detailed description, the transmitted light frequency of the light transmitter 1 may be controlled in a manner that in reverse to the characteristic as shown in FIG. 17, the initial voltage value $V_{A1}$ is set as the highest voltage value and the output voltage of the D-C converter 80 is reduced in sequence.

As has been described above, the embodiments as shown in FIG. 13 and FIG. 16 can simply meet the condition of making the intensity of resonance constant because they particularly vary the above-mentioned transmitted light frequency in a digital fashion. That is, they can simply supply the drive circuit of the light transmitter with pulse signals of different frequencies on the basis of pulse signals of arbitrary frequency of predetermined number whereby the intensity of resonance is stabilized or of the predetermined time during which the intensity of resonance is saturated in the low frequency region. Accordingly, by applying these embodiments, a distance measuring operation of higher precision can be expected in comparison with that of the embodiment which varies the transmitted light frequency in an analog fashion.

What is claimed is:

1. Method of optical measuring of distance comprising the steps of
pulse-modulating an infrared light by a pulse having frequency which is sweeping in a predetermined frequency range, thereby to produce a pulse-modulated infrared light,
transmitting said infrared light to an object, photoelectrically transducing reflected infrared light which is reflected from said object to produce an electric pulse signal, introducing said electric pulse signal to a resonator with a resonance frequency selected in said predetermined frequency range, thereby to make periodical resonation or tuning in said resonator and generating high voltage output signal through said resonation, and issuing a distance signal corresponding to said high voltage output signal.

2. An optical distance meter comprising
a light transmitter for transmitting an infrared light to an object,
a light transmitting means for making pulse-modulation of said infrared light with a modulation signal having frequency which is sweepingly varied within a predetermined frequency range,
a light beam receiving means for receiving reflected light from said object to convert it into electric signal,
a tuning means for making resonation of said electric signal, with a resonation frequency selected in said predetermined frequency range to produce a high voltage output signal,
a distance signal generating means for generating a distance signal corresponding to said high voltage output signal.

3. An optical distance meter in accordance with claim 2, wherein
said light transmitting means comprises a constant current source for feeding a constant current to said light emitter element, a driving means for controlling feeding of current to said light emitter element, a variable frequency oscillation means for oscillating said modulation signal wherein frequency of oscillation varies responding to a control voltage impressed thereon, a controlling circuit for issuing said control voltage which, at change of state of a start switch means, to issue said control voltage which gradually varies as time passes.

4. An optical distance meter in accordance with claim 3, wherein
said driving means comprises a series-connection unit of a constant current source and a transistor which is connected to said light transmitter, and a pulse output issued from said oscillator is supplied to said transistor.

5. An optical distance meter in accordance with claim 3, wherein
said controlling circuit comprises a start switch which is turned on at distance measurement and a capacitor whose charging is started by turning on this start switch, and charging voltage of said capacitor is supplied to an oscillation control circuit.

6. An optical distance meter in accordance with claim 3, wherein
said controlling circuit comprises a change-over switch means capable of change-over between a first state and a second state and a capacitor which forms a charging loop through said first state of said change-over switch means and forms a discharging loop through an oscillation circuit through said second state, and normally charging of said capacitor is performed at said first state of said change-over switch, and charged electricity of said capacitor is supplied to said oscillation circuit by setting to said second state at distance measurement.

7. An optical distance meter in accordance with claim 2, characterized in that
said light beam transmitting means comprises
a driving circuit comprising a series-connection unit of a constant current source and a transistor which is connected in series to a light transmitter and a switching element which is connected in parallel with said light beam transmitter,
an oscillation means which generates a pulse signal of a frequency corresponding to a voltage value to be supplied, supplies it to said switching element, and thereby controls operation of said switching element, and
a controlling circuit which has a switching means for determining a time of starting distance measurement, generates a voltage whose value is varied with time by operation of said switching means to supply said oscillation circuit with it, and also puts said transistor in a conductive state, and energy supply to said light beam transmitter is controlled by bypass or non-bypass of a current supplied to said light beam transmitter by means of conduction of transistor caused by operation of said switching means and by means of operation state of said switching element caused by said oscillation circuit.

8. An optical distance meter in accordance with claim 2, wherein
a distance signal generating means comprises
an amplifier which amplifies an output signal produced by resonance operation of said tuning means, and
a distance signal generating circuit which supplies an output signal level of said amplifier to a plurality of comparators having a plurality of reference voltages as an operation level, and outputs an output state of said plurality of comparators as a signal of distance to said object.

9. An optical distance meter in accordance with claim 2, characterized in that
a light beam transmitting means comprises
a driving circuit which comprises a constant current source which is connected in series to a light beam transmitter, and also controls current supply to said light beam transmitter by said constant current source,
an oscillation circuit which outputs a pulse output of a frequency corresponding to a voltage value to be supplied, and supply said driving circuit with it, and
a controlling circuit which comprises a capacitor which is charged to a predetermined voltage value near an operation voltage at which said oscillation circuit is normally operated before distance measuring operation, and also is charged to a voltage region higher than said predetermined voltage value by operation of a switching means which determines said time of starting distance measurement, and supplies a terminal voltage of said capacitor which rises with time, and
a distance signal generating means operates in interlocking with distance measurement starting operation of said switching means, and provides a peak holding circuit which holds a light receiving output or a peak of a signal obtained by said light receiving output.

10. An optical distance meter in accordance with claim 9, characterized in that
a controlling circuit comprises
a first series-connection unit which comprises a second constant current source which is connected to both terminals of a power source through a power switch, and a first switching element and a capacitor,
a discharging means which is connected to both terminals of said capacitor,
a second series-connection unit which is connected to both terminals of said capacitor and comprises a resistor and a second switching element,
a first gating means which puts said first switching element in conductive state by supply of said power source through said power switch, and
a second gating means which performs a gating operation putting said second switching element in conductive state by supply of said power source through said power switch, and also stops said gating operation by a distance measurement start operation of a switching means determining a starting time of distance measurement.

11. An optical distance meter in accordance with claim 9, characterized in that
a controlling circuit comprises
a series-connection unit which comprises a second constant current source which is connected to both terminals of a power source through a power switch, a first switching element and a capacitor,
a discharging means which is connected in parallel with said capacitor,
a first transistor whose collector and emitter are connected across both terminals of said capacitor,
a second transistor whose collector and emitter are connected across the collector and the control electrode of said first transistor,
a gating signal generation means which comprises a series-connection unit of a first resistor and a second resistor and is connected across both terminals of said power source through said power switch, and is constituted by connecting a point of connection between said first and second resistors to said control electrode of said first switching element,
a gating means which comprises a series-connection unit of a third resistor connected in parallel with said gating signal generation means and a switching means determining a starting time of distance measurement, and the point of connection therebetween is connected to the control electrode of a second transistor in advance.

12. An optical distance meter in accordance with claim 9, wherein said controlling circuit comprises:
a first series-connection unit which comprises a second constant current source, a first switch element and a capacitor and is connected across both terminals of a power source through a power switch,
a discharging means which is connected across both terminals of said capacitor,
a second series-connection unit which comprises a control switch, which is turned on in interlocking with an operation of turning on said power switch and is turned off by an arbitrary starting operation providing a starting time of distance measurement, a resistor and a second switch element, and is connected across both terminals of said capacitor,
a comparator which compares the charging voltage of said capacitor to be supplied with a predetermined reference voltage and puts said second switching element in conductive state when the charging voltage exceeds said predetermined voltage,
a gating means which is connected across both terminals of said power source through said power switch, and puts said first switching element in conductive state when said power switch is turned on.

13. An optical distance meter in accordance with claim 9, characterized in that a controlling circuit provides
a first charging means which comprises a series-connection unit of a control switch which is turned on by turning on a power switch and is turned off in interlocking with distance measurement starting operation of a switching means determining a starting time of distance measurement and a first current supplying means supplying a capacitor with a first charging current, and
a second charging means which comprises a second current supplying means which is connected in parallel with said series-connection unit and supplies said capacitor with a second charging current.

14. An optical distance meter in accordance with claim 9, characterized in that a driving circuit comprises a series-connection unit of a constant current source which is connected in series to a light beam transmitter and a transistor which is supplied with a pulse output issued from an oscillation circuit.

15. An optical distance meter in accordance with claim 9, characterized in that a driving circuit comprises
a series-connection unit of a constant current source which is connected in series to a light beam transmitter and a transistor which is put in conductive state in interlocking with distance measurement starting operation of a switching means determing a starting time of distance measurement, and
a switching element which is connected in parallel with said light beam transmitter and is supplied with a pulse output issued from an oscillation circuit to be operation-controlled.

16. An optical distance meter in accordance with claim 2, characterized in that a light beam transmitting means comprises
a driving circuit which supplies a light beam transmitter with energy by operation thereof, and
a digital frequency setting means which supplies said driving circuit with a pulse signal whose frequency is varied digitally in a predetermined frequency band by a predetermined number or more, and digitally controls a transmitted light frequency of said light beam transmitter by intermittently making operation of said driving circuit.

17. An optical distance meter in accordance with claim 16, characterized in that a digital frequency setting means comprises
an oscillator which generates a reference clock signal,
a first counting circuit which counts by receiving said reference clock signal,
an initial frequency setting means which is operated by receiving a distance measurement starting signal, and generates a first control signal which sets either side of the low and high frequencies providing a frequency band to be varied as an initial frequency, an arithmetic circuit which outputs a first digital signal indicating the number of said reference clock signal corresponding to the frequency of one side which is set as said initial frequency by receiving said first control signal, and also varies the content of said first digital signal by receiving a second control signal, a first magnitude comparator which compares a count output of said first counting circuit with said first digital signal output from said arithmetic circuit, and outputs an equality output signal which resets the content of count of said counting circuit when both of said signals are equal, a flip-flop circuit which generates a pulse signal inverting an output state by receiving said equality output signal, and supplies a driving circuit of a light beam transmitter with it, a counting means which counts the number of pulse signal output from said flip-flop circuit, and outputs reset signals of said second control signal and itself when the count value becomes a predetermined number, a final frequency setting means which outputs a second digital signal indicating the number of said reference clock signal corresponding to the final frequency which forms said frequency band together with said initial frequency, and a second magnitude comparator which compares a second digital signal output from said final frequency setting means with a first digital signal output from said arithmetic circuit, and outputs an operation end signal which stops a series of distance measuring operations when both of said signals are equal.

18. An optical distance meter in accordance with claim 16, characterized in that a digital frequency setting means comprises an oscillation means which outputs a pulse signal of a frequency corresponding to a voltage value to be supplied and supplies a driving circuit of a light beam transmitter with it, an oscillator which outputs a reference pulse signal every arbitrary period of time longer than a time during which said oscillation circuit can output said pulse signal of a number by which the intensity of resonance by a tuning means is saturated even in the low frequency region of one side forming a limit of frequency band which is desired to be varied, a counter which counts said reference pulse signal, a D-A converter which outputs a voltage value corresponding to a first digital signal to be supplied, an initial value setting circuit which sets a second digital signal corresponding to a voltage value at which said oscillation circuit does not perform an abnormal operation by receiving a distance measurement starting signal, and an adder which outputs a second digital signal by said initial value setting circuit as said first digital signal, and also varies said first digital signal in sequence by a change in count output of said counter.

* * * * *